(12) United States Patent
Sadiku et al.

(10) Patent No.: US 10,938,282 B2
(45) Date of Patent: Mar. 2, 2021

(54) METHOD FOR PRODUCING A COIL WINDING FOR INSERTING INTO RADIALLY OPEN GROOVES OF STATORS OR ROTORS OF ELECTRIC MACHINES

(71) Applicant: Schaeffler ELMOTEC STATOMAT GmbH, Karben (DE)

(72) Inventors: Sadik Sadiku, Neuberg (DE); Keith Witwer, Fort Wayne, IN (US)

(73) Assignee: Schaeffler ELMOTEC STATOMAT GmbH, Karben (DE)

( * ) Notice: Subject to any disclaimer, the term of this patent is extended or adjusted under 35 U.S.C. 154(b) by 235 days.

(21) Appl. No.: 15/779,534

(22) PCT Filed: Nov. 24, 2016

(86) PCT No.: PCT/EP2016/078666
§ 371 (c)(1),
(2) Date: May 28, 2018

(87) PCT Pub. No.: WO2017/089455
PCT Pub. Date: Jun. 1, 2017

(65) Prior Publication Data
US 2018/0331606 A1 Nov. 15, 2018

(30) Foreign Application Priority Data
Nov. 27, 2015 (DE) .................... 10 2015 120 661.7

(51) Int. Cl.
*H01F 7/06* (2006.01)
*H02K 15/04* (2006.01)

(52) U.S. Cl.
CPC ................. *H02K 15/0478* (2013.01)

(58) Field of Classification Search
CPC ..................... H02K 3/12; H02K 15/0478
See application file for complete search history.

(56) References Cited

U.S. PATENT DOCUMENTS 3,820,728 A 6/1974 Pitt et al.
4,416,058 A * 11/1983 Henry, Sr. ............ H02K 15/068
29/596

(Continued)

FOREIGN PATENT DOCUMENTS

CN 1813391 8/2006
CN 1989681 6/2007

(Continued)

OTHER PUBLICATIONS

Official Action dated Oct. 6, 2016 From the US Patent and Trademark Office Re. U.S. Appl. No. 14/204,867. (9 Pages).

(Continued)

*Primary Examiner* — Paul D Kim

(57) ABSTRACT

The method according to the invention is used to produce a coil winding (70) which can be inserted into the grooves of a stator or rotor of an electric machine. While using a winding template (26) and a wire handling device (14), the invention proposes carrying out a displacement process between a first and a second holding region (34, 36) even before the wires (32) are initially wound onto the winding template (26) in order to produce an inclined wire section (40) which is subsequently shaped into winding heads (42) by means of a rotating/winding process. The novel method offers the advantage that all of the wires (32) of a coil winding (70) can be processed simultaneously using a comparably simple winding device (110). The projection of the winding heads (42) over the stator can also be minimized.

19 Claims, 28 Drawing Sheets

(56) References Cited

U.S. PATENT DOCUMENTS

| | | | |
|---|---|---|---|
| 5,664,317 A | 9/1997 | Ponzio et al. | |
| 6,140,735 A | 10/2000 | Kato et al. | |
| 6,141,865 A | 11/2000 | Kakutani et al. | |
| 6,687,974 B1 | 2/2004 | Asao et al. | |
| 6,750,581 B2 | 6/2004 | Neet | |
| 6,759,779 B2 | 7/2004 | Neet | |
| 6,826,823 B2 | 12/2004 | Neet | |
| 6,862,797 B2 | 3/2005 | Neet | |
| 7,152,306 B2 | 12/2006 | Andersson et al. | |
| 7,269,888 B2 | 9/2007 | Neet | |
| 7,281,312 B2 | 10/2007 | Sadiku et al. | |
| 7,337,525 B2 | 3/2008 | Ueda et al. | |
| 7,703,192 B2 * | 4/2010 | Sadiku | H02K 15/0478 29/596 |
| 8,667,666 B2 * | 3/2014 | Sadiku | H02K 3/12 29/596 |
| 8,966,742 B2 * | 3/2015 | Wolf | H02K 15/0414 29/596 |
| 10,615,654 B2 * | 4/2020 | Sadiku | H02K 3/12 |
| 2003/0024104 A1 * | 2/2003 | Sadiku | H02K 15/068 29/605 |
| 2005/0005428 A1 * | 1/2005 | Stratico | H02K 15/0056 29/605 |
| 2005/0168093 A1 | 8/2005 | Higashino et al. | |
| 2005/0189833 A1 | 9/2005 | Liao | |
| 2005/0258703 A1 | 11/2005 | Kouda et al. | |
| 2006/0006757 A1 | 1/2006 | Seguchi | |
| 2006/0022547 A1 | 2/2006 | Sadiku et al. | |
| 2006/0032040 A1 | 2/2006 | Neet | |
| 2006/0033394 A1 | 2/2006 | Ogawa et al. | |
| 2006/0103255 A1 | 5/2006 | Seguchi et al. | |
| 2006/0226727 A1 | 10/2006 | Bramson et al. | |
| 2007/0018527 A1 | 1/2007 | Neet | |
| 2007/0200449 A1 | 8/2007 | Hayashi et al. | |
| 2014/0252908 A1 | 9/2014 | Sadiku et al. | |

FOREIGN PATENT DOCUMENTS

| | | |
|---|---|---|
| CN | 101350547 | 1/2009 |
| CN | 101432951 | 5/2009 |
| CN | 102007675 | 4/2011 |
| DE | 102004035084 | 2/2006 |
| DE | 102008019479 | 10/2009 |
| DE | 102014003602 | 9/2015 |
| EP | 1469579 | 10/2004 |
| EP | 1771932 | 4/2007 |
| JP | 4452984 | 4/2010 |
| JP | 2014-045622 | 3/2014 |
| WO | WO 2005/074105 | 8/2005 |
| WO | WO 2010/085986 | 8/2010 |
| WO | WO 2015/158996 | 10/2015 |

OTHER PUBLICATIONS

Official Action dated Apr. 28, 2017 From the US Patent and Trademark Office Re. U.S. Appl. No. 14/204,867. (9 Pages).

Examination Report Under Sections 12 & 13 of the Patents Act, 1970 and the Patent Rules, 2003 dated Feb. 14, 2020 From the Government of India, Intellectual Property India, Patents, Designs, Trade Mark, Geographical Indications, The Patent Office Re. Application No. 201817018321. (6 Pages).

Grounds of Reasons of Rejection dated Sep. 30, 2019 From the Korean Intellectual Property Office Re. Application No. 10-2018-7016310. (5 Pages).

International Search Report and the Written Opinion dated Mar. 8, 2017 From the International Searching Authority Re. Application No. PCT/EP2016/078666 and Its Translation of Search Report Into English. (17 Pages).

Notice of Reasons for Rejection dated Mar. 9, 2019 From the Japan Patent Office Re. Application No. 2018-524463. (8 Pages).

Notification of Office Action and Search Report dated May 9, 2020 From the China National Intellectual Property Administration Re. Application No. 201680068907.9 and Its Translation Into English. (16 Pages).

Notification of Office Action and Search Report dated Aug. 28, 2019 From the China National Intellectual Property Administration Re. Application No. 201680068907.9 and Its Translation Into English. (12 Pages).

Request for Examination dated Sep. 16, 2016 From the German Patent and Trademark Office Re. Application No. 102015120661.7. (7 Pages).

* cited by examiner

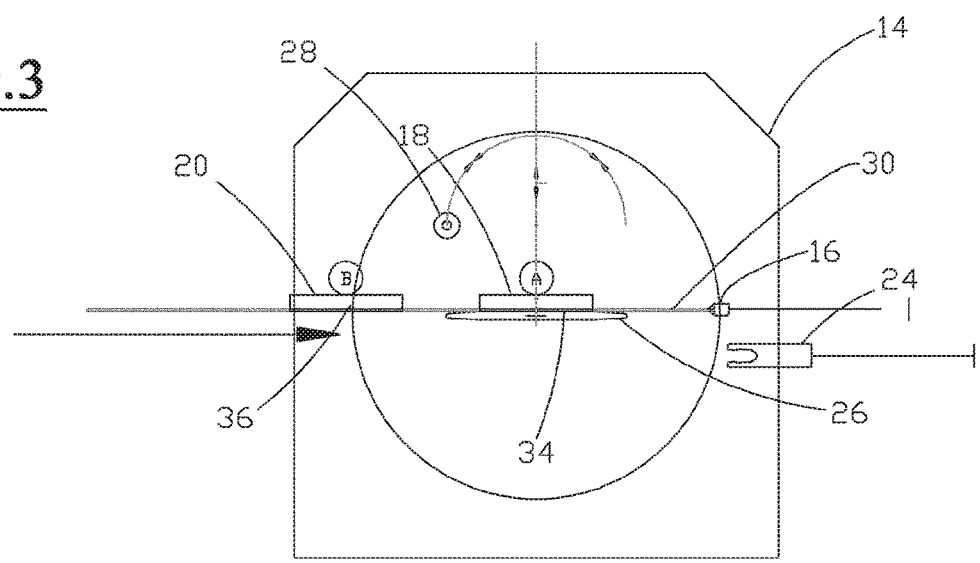
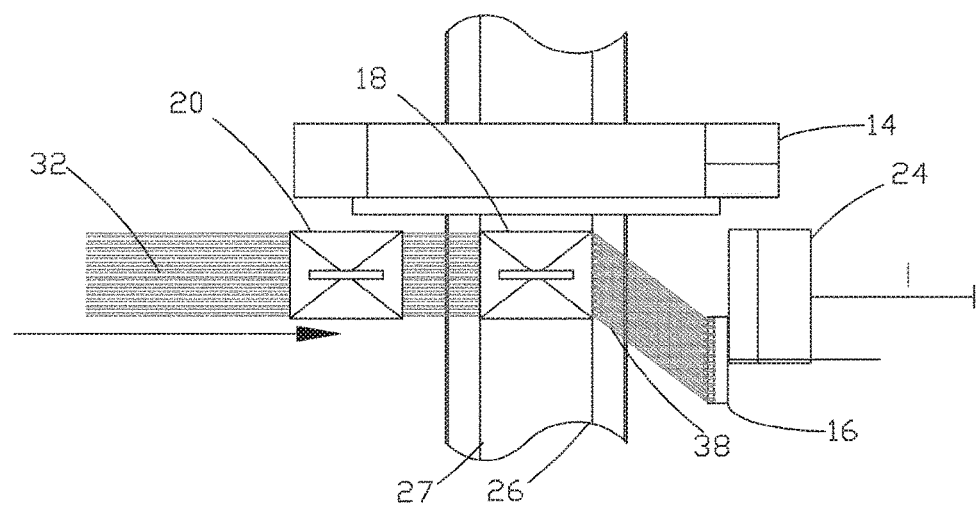
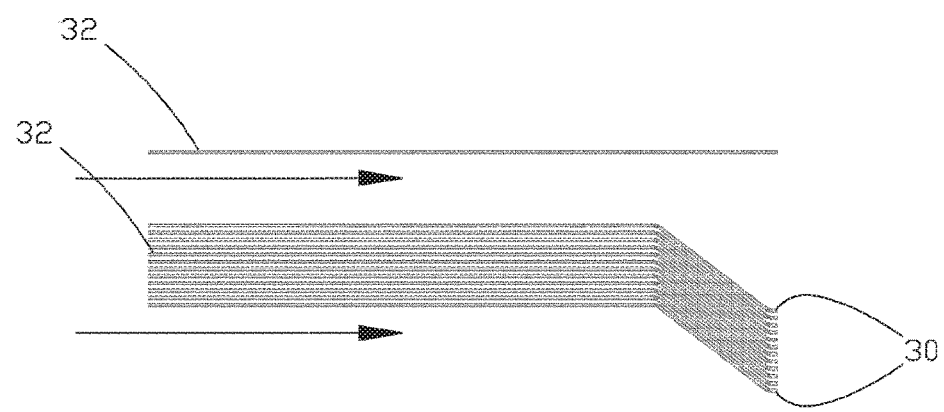
Fig.3

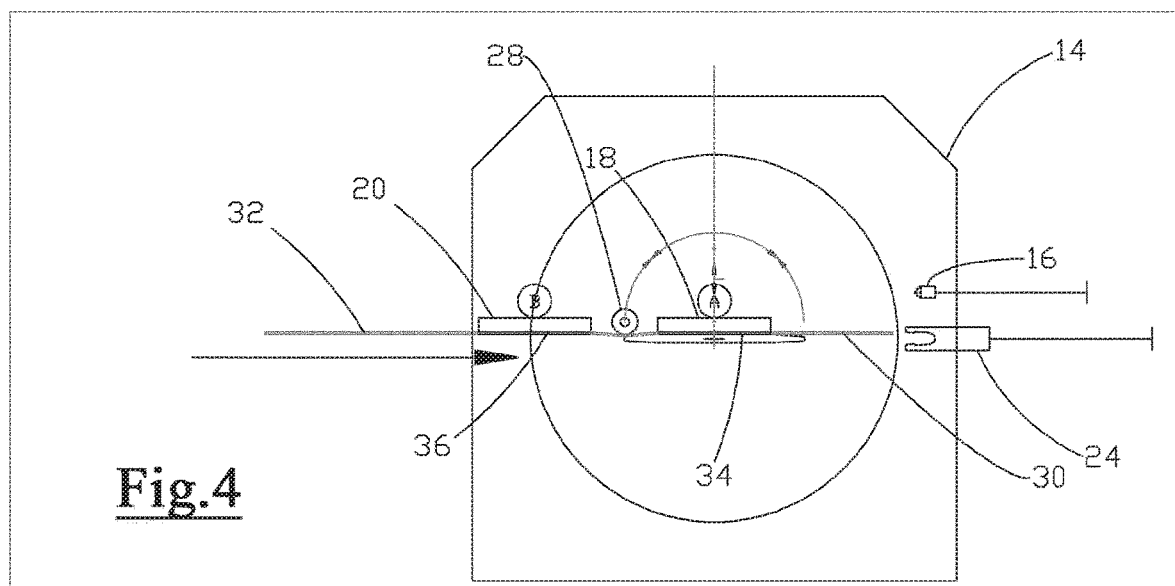
Fig.4
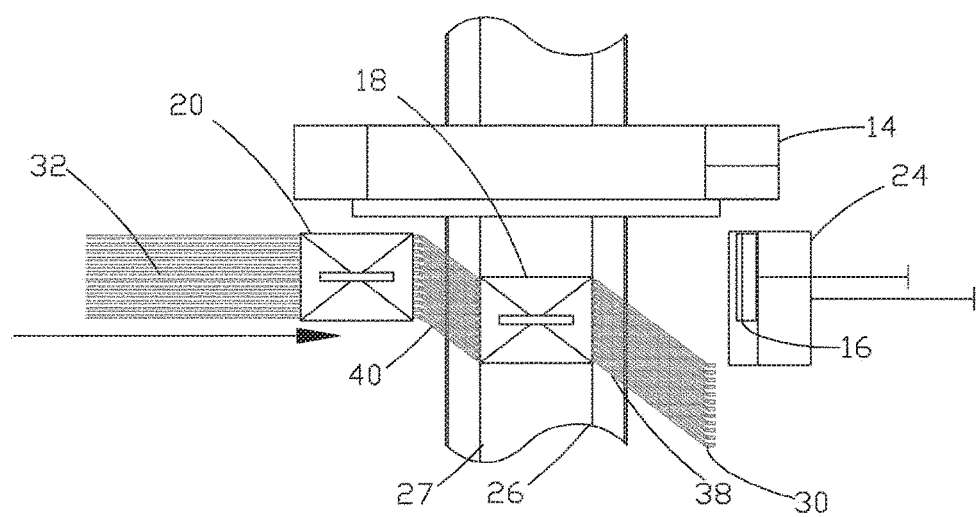
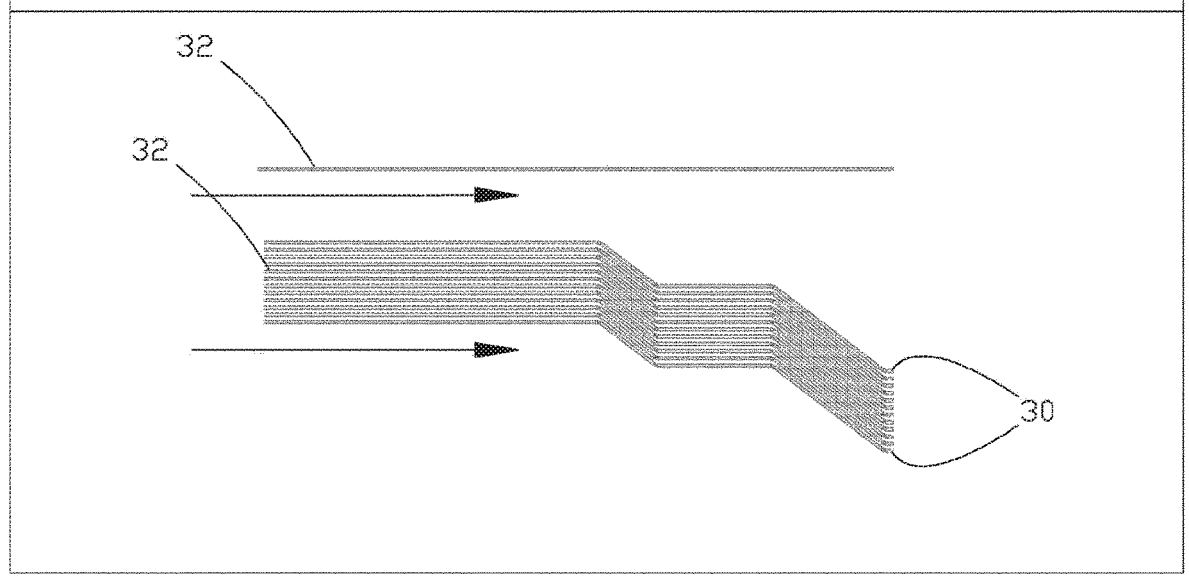

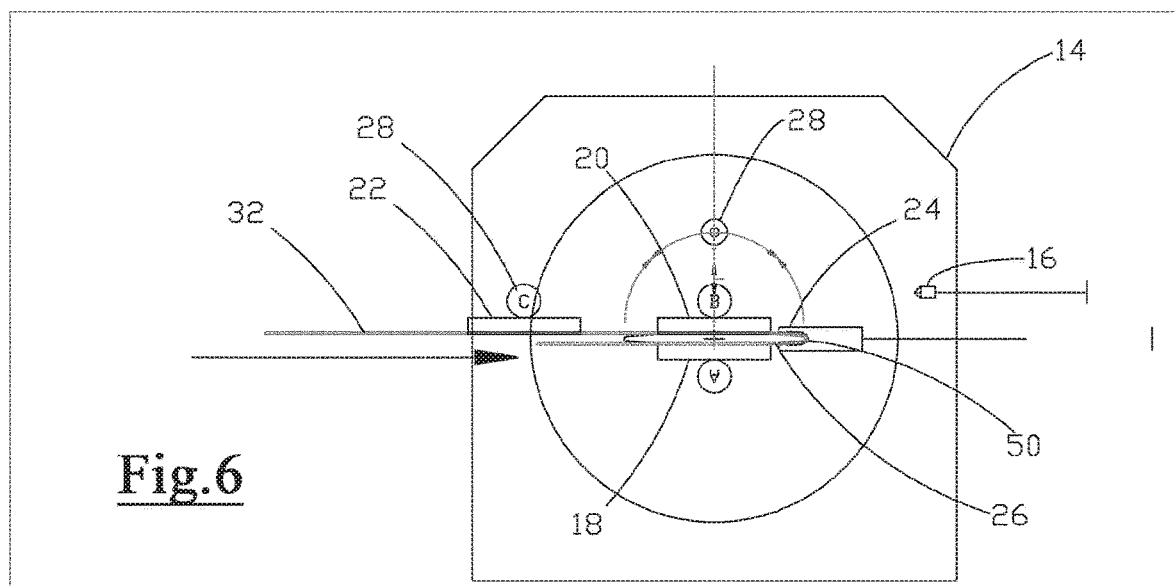
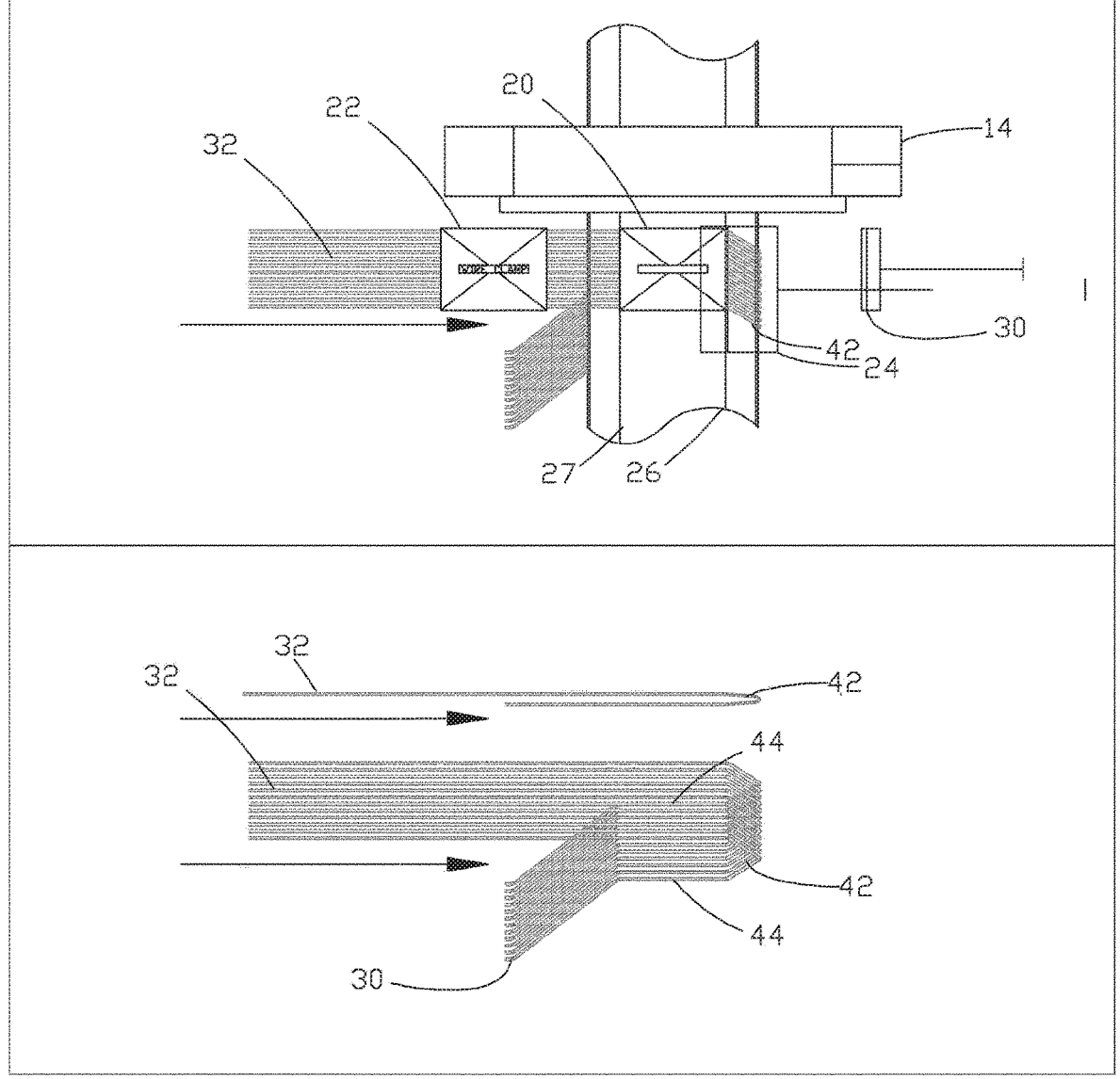
Fig.6

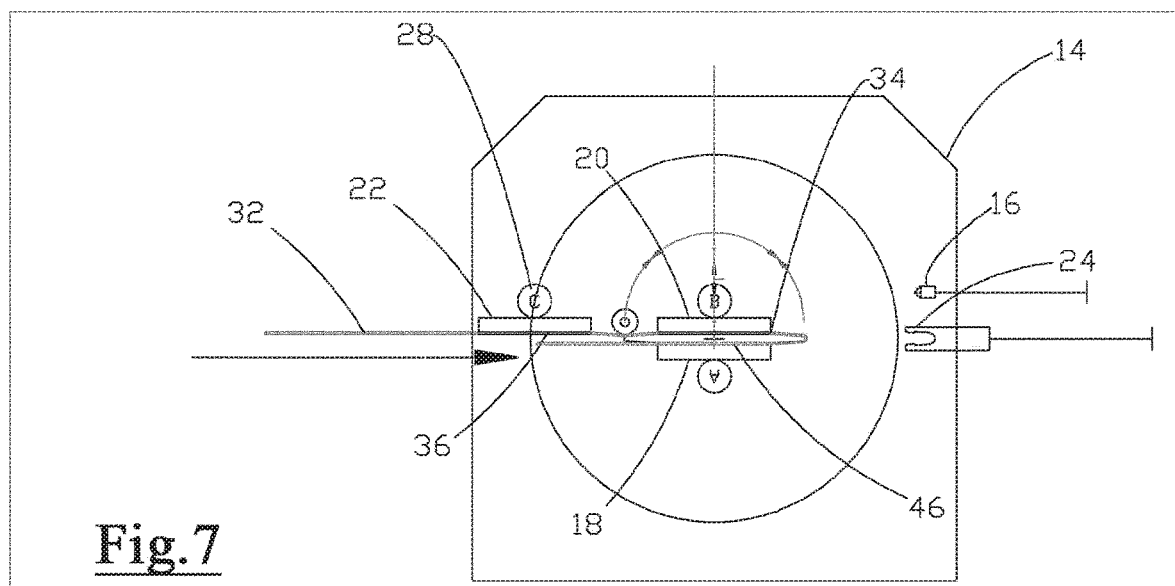
Fig.7
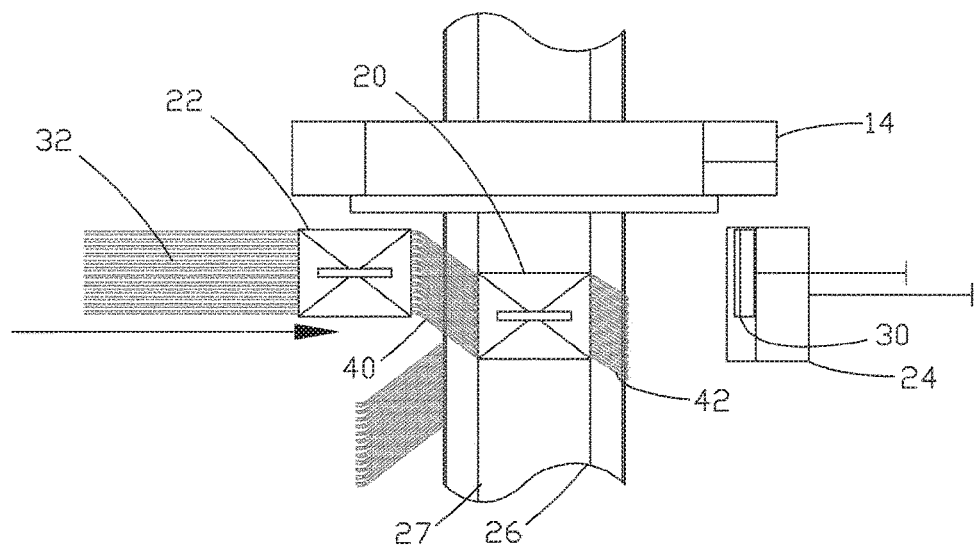
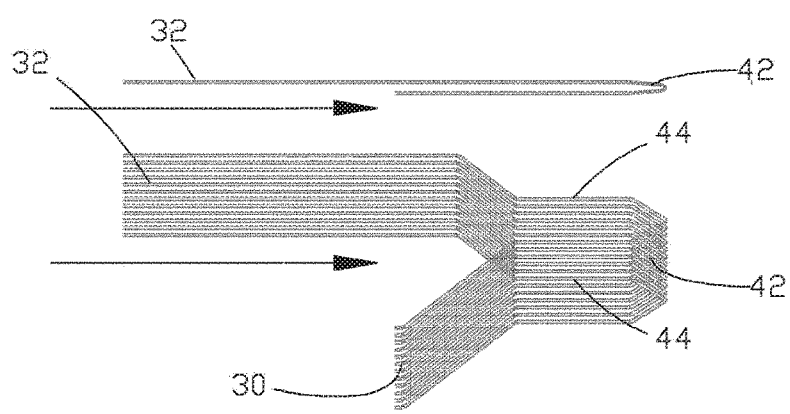

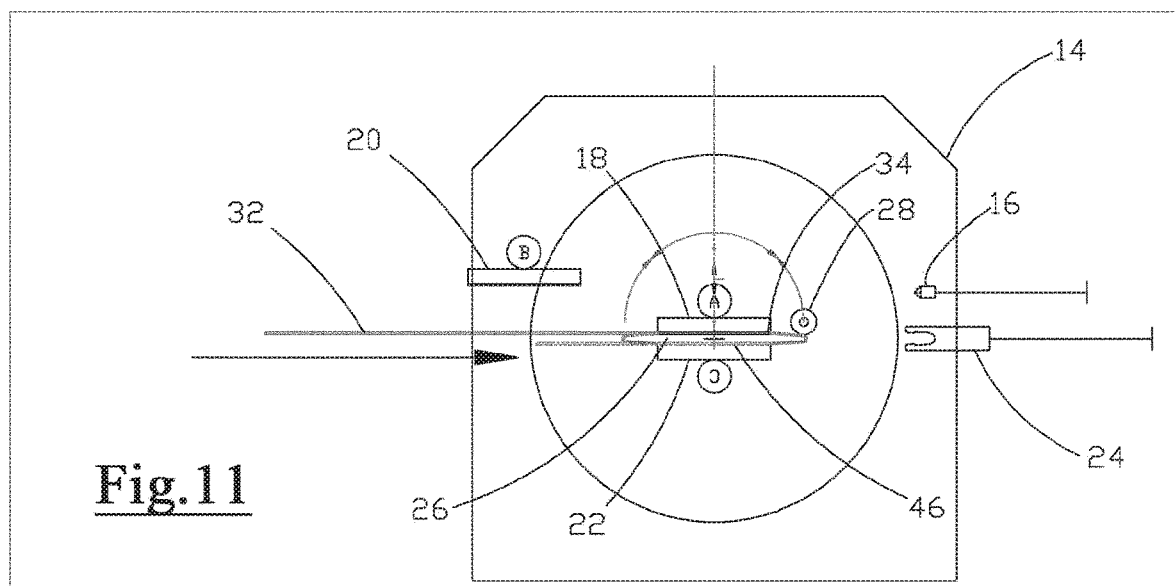
Fig.11
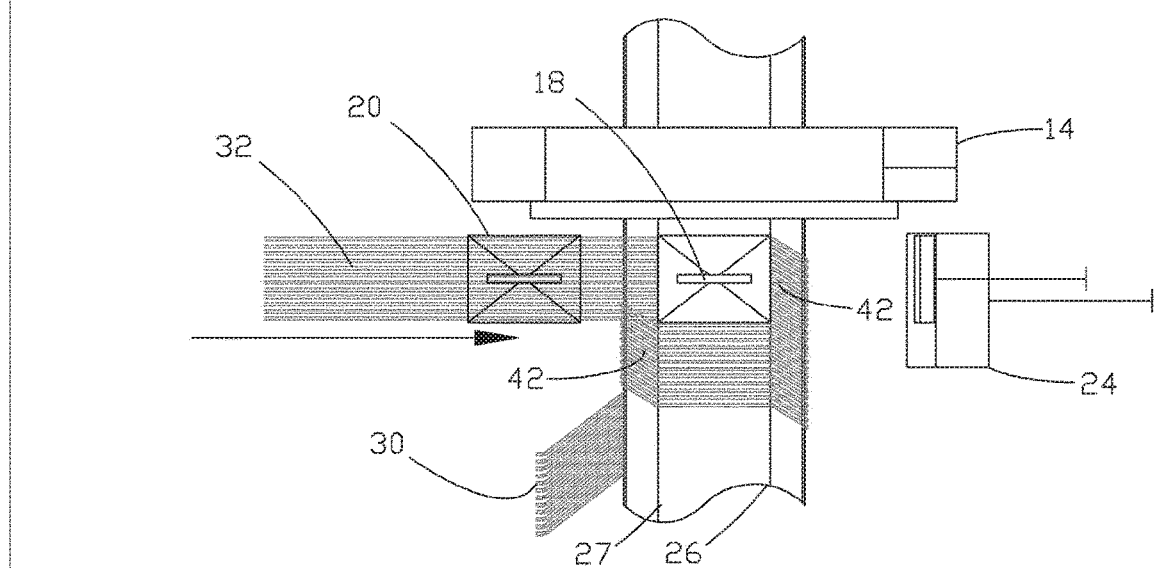
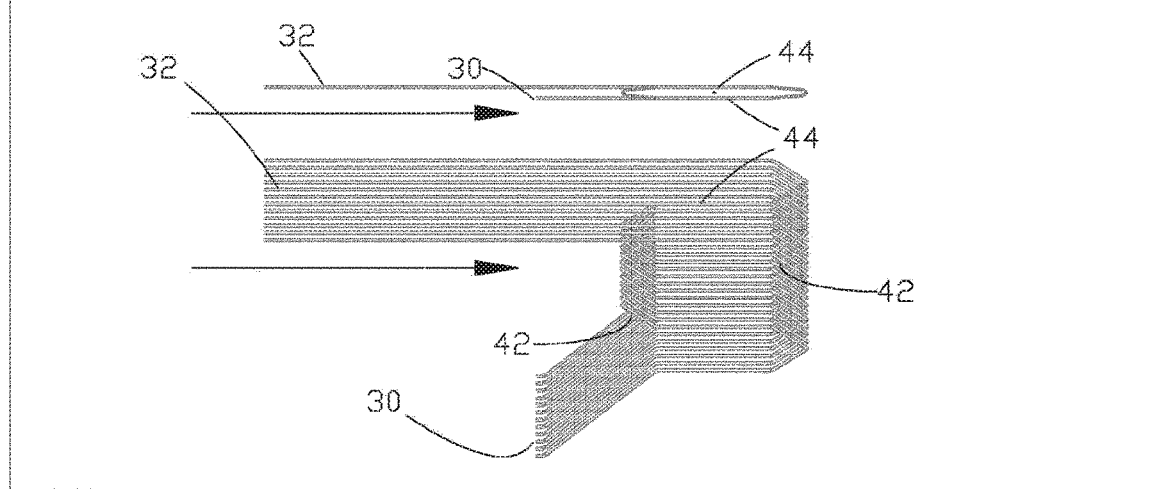

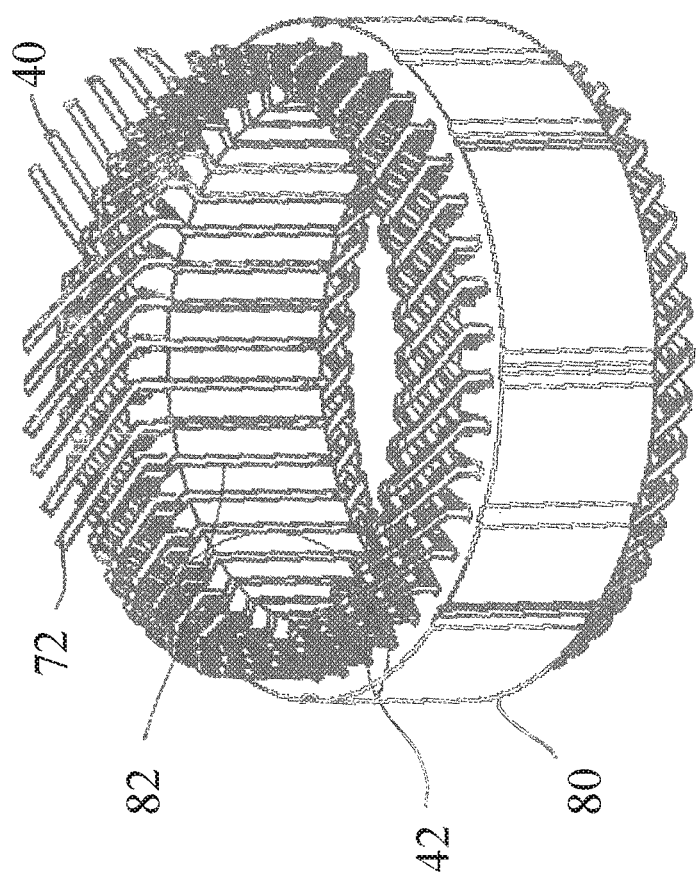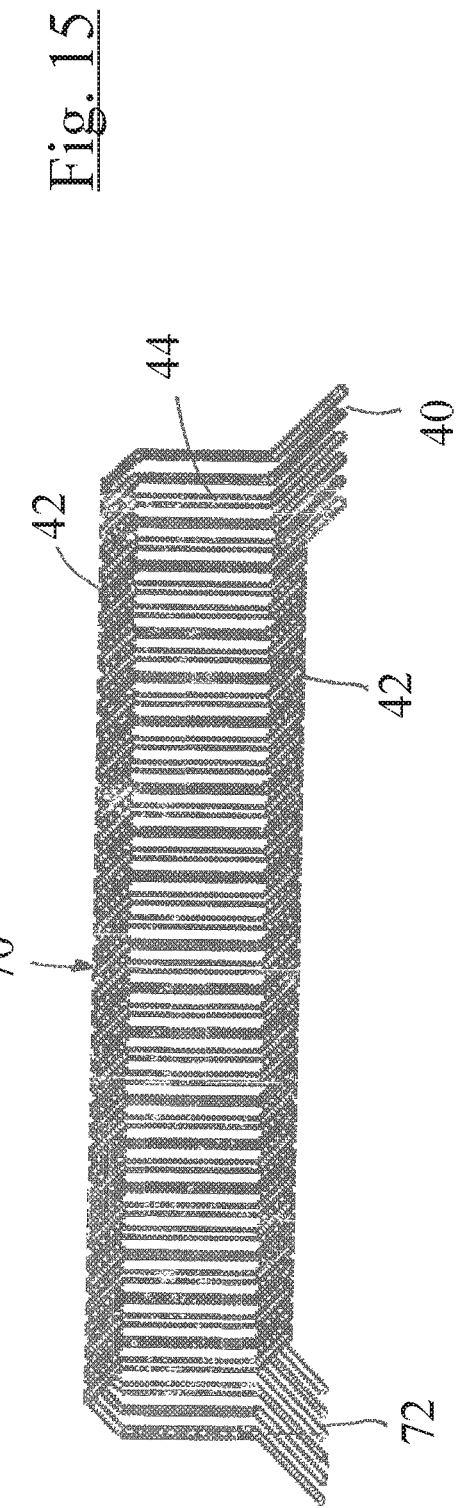

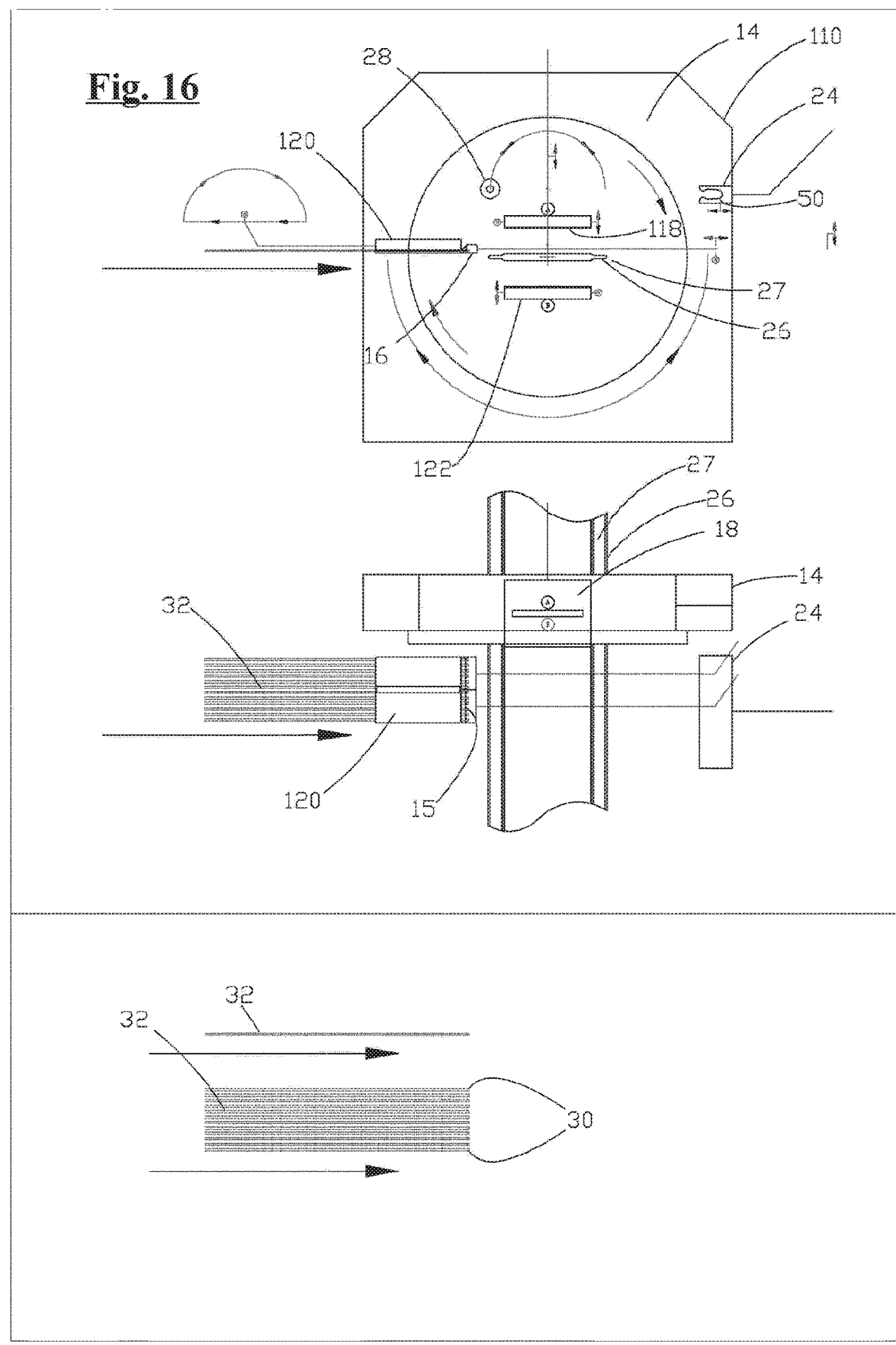

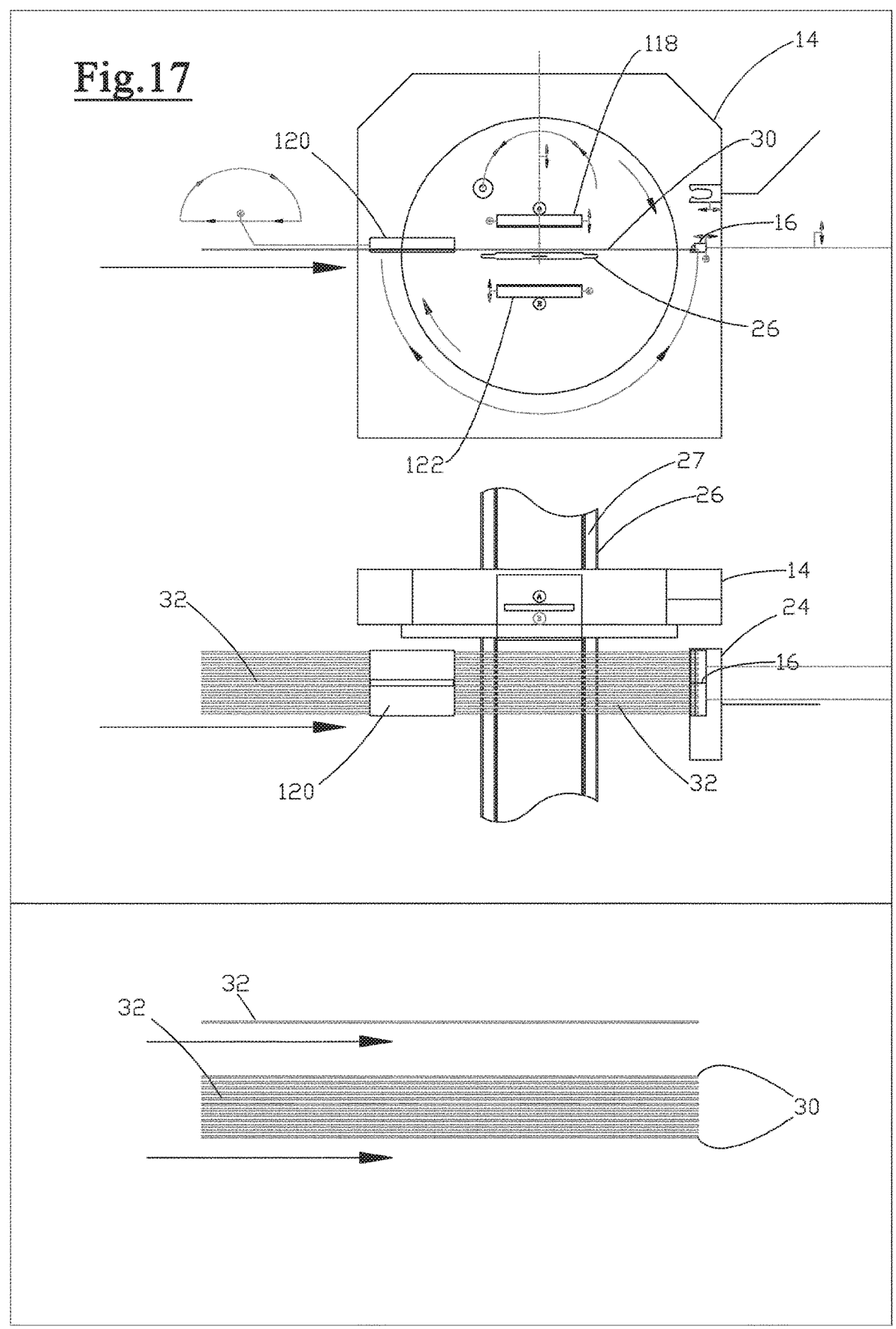

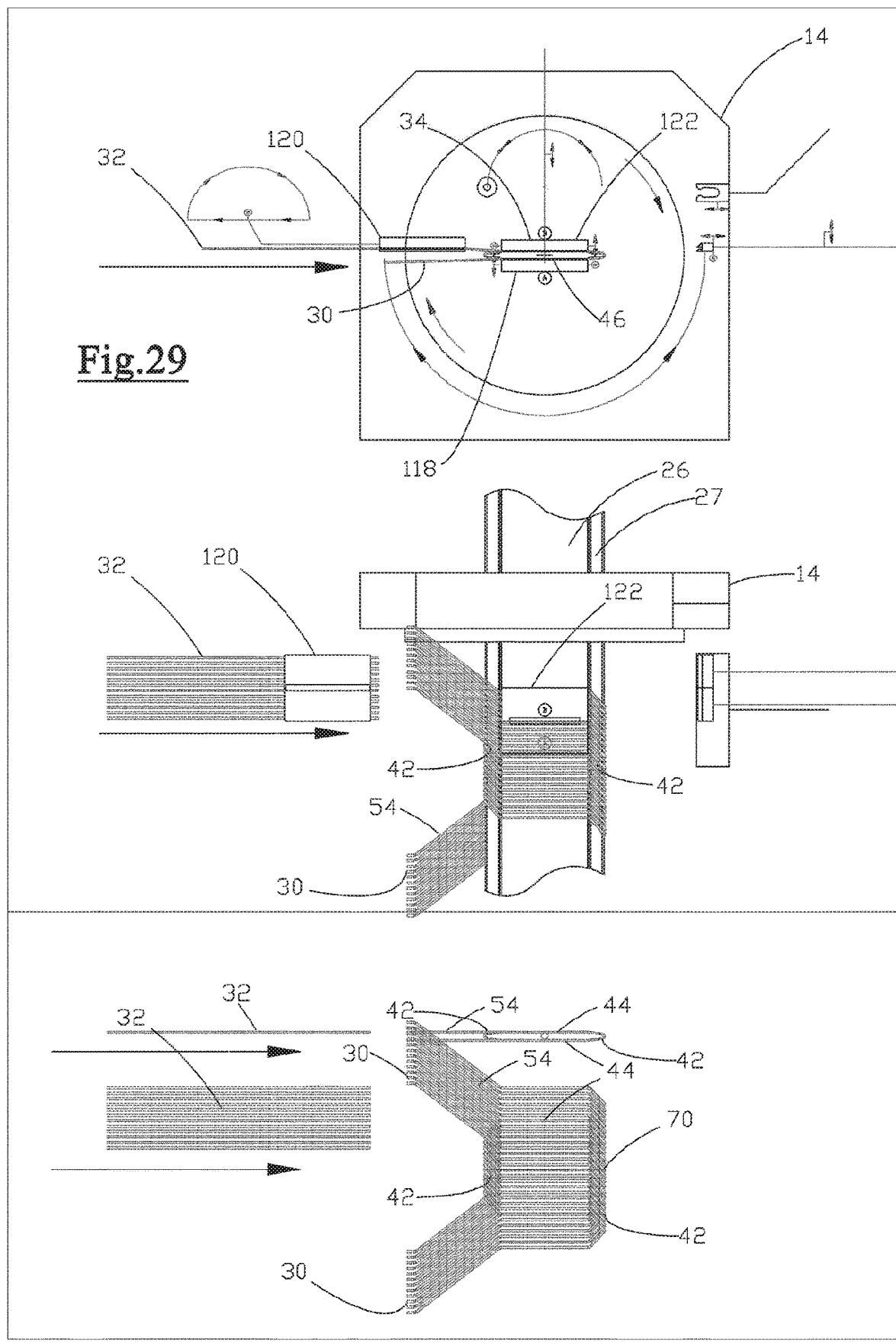

METHOD FOR PRODUCING A COIL WINDING FOR INSERTING INTO RADIALLY OPEN GROOVES OF STATORS OR ROTORS OF ELECTRIC MACHINES

RELATED APPLICATIONS

This application is a National Phase of PCT Patent Application No. PCT/EP2016/078666 having International filing date of Nov. 24, 2016, which claims the benefit of priority of German Patent Application No. 10 2015 120 661.7 filed on Nov. 27, 2015. The contents of the above applications are all incorporated by reference as if fully set forth herein in their entirety.

FIELD AND BACKGROUND OF THE INVENTION

The invention is concerned with a method for producing a coil winding for inserting into radially open grooves of stators or rotors of electric machines, wherein the coil winding consists of a number of wires which are intertwined together and are bent round multiple times in opposite directions such that legs of the wires, which lie parallel to one another and are intended for filling out the grooves, are connected by roof-like winding heads which protrude at the front end beyond the rotors or stators, wherein a flat and rotatable winding template and a wire handling device are used.

The method is also suitable, in particular, for using wires that are essentially rectangular in cross section and are preferred with regard to an optimum filling level in the grooves of the stator. Conventional winding methods for round wire are not usable for such wire cross sections.

The present method serves above all for producing a so-called distributed wave winding which can then be inserted into the grooves of a stator (or rotor). A distributed wave winding comprises a plurality of parallel wires which have straight portions which are arranged in the grooves of a stator. Said straight portions alternate between an inner and an adjacent outer radial position in the stator when the wire pattern is moved radially around the stator. Said distributed wave pattern includes an X number of phases or grouped grooves in the stator. Generally speaking, X is a multiple of 3, structures are also possible, however, where X is an arbitrary other whole number. The number of parallel wires in the winding pattern of the distributed wave is 2 X. In the wave pattern, the straight portions of the wire from one slot are connected to the straight portions of the wire in the groove, the X grooves are located at a distance in the anti-clockwise direction and the clockwise direction, being connected by fork-shaped connecting wires or end bend portions. The wave is generated as a result of one of the two connecting end portions being connected to the groove at a distance of X grooves in the anti-clockwise direction, whilst on the oppositely situated side of the stator the associated end bend portion is connected to the groove at a distance of X grooves in the clockwise direction. Said end connections alternate as the wire pattern is moved radially around the stator. Said fork-shaped connections also ensure the positional change between the alternating inner and outer or outer and inner radially adjacent positions of the straight wire portions over the stator grooves in the case of each of the individual wires which form the winding pattern. The ultimately prefabricated, wire pattern has 2 X parallel wires which are wound in a continuous, distributed and interwoven wave pattern which is designed in a flat manner. Said pattern has 2 X beginning wires in an upper position and 2 X end wires in a lower position. These are simple straight wire portions. All the other straight wire portions between said beginning and end wires are realized in pairs with a wire in the lower position and a wire in the upper position. The total number of said straight wire portions is determined by the number of conductors which are filled into each groove of the stator structure with said pattern. The number of conductors in a stator groove has to be a multiple of two, the total number of wires in a stator groove to be filled in the case of said pattern is two A, A being the number of revolutions by which the winding pattern winds around the stator circumference.

The precise appearance of the winding to be generated is explained in more detail within the framework of the exemplary embodiment.

EP 1 469 579 B1 discloses a method for producing such a winding which is based on a hexagonal template. Said method could certainly not be implemented in practice as the technical realization is difficult.

DE 10 2014 003 602 A1 discloses a method which also relies on a relatively complex winding template which is rotated in 120° steps. A complex winding device, the technical realization of which is difficult, is also necessary for said method.

A further method is disclosed in DE 10 2008 019 479 A1. Here, as already mentioned, two winding halves have first of all to be wound by means of a flat, strip-shaped template, the two halves then subsequently being intertwined together to form then the overall winding which is to be inserted into the stator. A very similar method is disclosed in DE 10 2004 035 084 A1. This provides a practically identical production of both part windings but differs in the manner in which the two halves are combined together. An indirect winding of all the wires with the number 2 X is in any case not possible in the case of either method, as after the displacement, which corresponds to the first bending to produce the bent winding heads, by X times the distance of the wires, half of the wires would still collide with the wires in the region of the wire feed. The combining of the two halves of the distributed wave winding is certainly not particularly problematic but provides an additional method step and requires precise alignment of the two halves with respect to one another before they are inserted into a hopper, from which they are then inserted into the grooves of the stator. The final two steps of inserting into the hopper and of transferring into the grooves of the stator are known as such and are also used in addition to the method put forward here in order then to produce the desired stator or rotor finally with the produced windings. Subsequently adding the additional wires into the current method is not possible either in the case of said method configuration as even wires added subsequently would collide with the wires already processed with the winding step initially provided here.

SUMMARY OF THE INVENTION

The object of the present invention consists in creating a method of the type named in the introduction which, using a simple winding template, enables the production of the entire coil winding in one method sequence without the subsequent combining of two part-windings.

The object is achieved according to the invention by a method of the type mentioned in the introduction which comprises the following steps:

A) feed all the wires which are used for the coil winding in parallel in a direction perpendicular to the rotational axis of the winding template;
B) hold the wires on the winding template at a fixing point in a first holding region of the legs to be realized;
C) hold the wires at a distance in front of the winding template with reference to the feed direction at a fixing point in a second holding region;
D) prior to the first rotation of the winding template, the first holding region of the winding template is displaced relative to the second holding region parallel to the rotational axis of the winding template by an amount, the length of which is approximately equal to or equal to half the distance of the outermost wires, as a result of which a wire portion, which is angled with reference to the legs, is formed between the first and the second holding regions;
E) after a preceding displacement according to D, the winding template is rotated by 180°, wherein the fixing point from the first holding region is displaced into a third holding region on the side of the winding template located opposite the first holding region and the fixing point from the second holding region is displaced into the first holding region;
F) fix the guided wires at the fixing point in the second holding region;
G) the holding action in the third holding region is disengaged prior to or after step F;
H) displace the first holding region relative to the second holding region parallel to the rotational axis of the winding template by a section, the length of which is approximately equal to or equal to half the distance of the outermost wires, as a result of which a wire portion, which is angled with reference to the legs, is formed;
I) rotate the winding template by 180°, wherein once again the fixing point in the first holding region is displaced into the third holding region on the side of the winding template which is located opposite the first holding region and the second holding region is displaced into the first holding region;
J) repeat steps F to I until the coil winding is complete;
K) displace the first holding region for the last time relative to the second holding region parallel to the rotational axis of the winding template by an amount, the length of which is approximately equal to or equal to half the distance of the outermost wires, as a result of which a wire portion, which is angled with reference to the legs, is formed between the first and the second holding region;
L) sever the wires at the second holding region;
M) strip the coil winding from the winding template completely or in part.

The advantage provided by the new method is that all the wires with the number 2 times X (compared to up to now two winding halves, which are subsequently to be twisted, each with X number of wires) can be processed in a continuous method. An essential aspect of the newly specified method is that prior to the winding of the fed wire portions onto the winding template, in each case an angled wire portion is already generated which then during the winding process, i.e. when the winding template is rotated in steps E or I, is bent around in the middle and as a result realizes roof-shaped winding heads. As a result of said change in the method sequence, the combining of two part-windings which were initially generated independently of one another, which has been necessary up to now in the case of all winding methods which work with flat winding templates and 180° rotary steps, is able to be omitted, which represents a considerable simplification in the production of such windings and often for the first time makes it possible to integrate the winding method into largely automated, continuously running production processes.

It has also been shown that shorter winding heads can be realized as a result of the changed method sequence. Along with saving on material, the entire overall axial length of the rotor or stator is also reduced by said effect, which has a positive effect on the possible applications of an electric machine realized with such a rotor or stator because either a machine with a higher performance can be used on the identical installation space or installation space can be saved.

It is further to be noted that fixing the wires in the holding regions in an absolutely positionally exact manner is not necessary, possibly not even desirable. The essential point is that the wire is held in such a manner that the desired forming operations can be executed in a fluid manner, a certain adjusting of the wires anyhow or of the devices holding them is expedient in order to ensure compensation in particular within the framework of the displacement to realize the angled portions.

Preferred further developments of the method are provided in claims 2 to 17.

First of all, the basic design of the method makes it possible to form all the wires together in a continuous method to form a winding, this being able to run either such that from the start all the wires are fed at the same time or the wires are introduced into the current method in a gradual manner. In this connection, newly added wires are initially also fed in a gradual manner, then displaced in parallel thereby realizing an angled roof portion and finally are included in the synchronous rotate/displace sequence. In the latter case, the method then runs for longer at the end by the corresponding number of steps corresponding to the delays of some wires without the method flow having had to be interrupted as a result.

An embodiment of the method provides that the wires are fed using a wire drawing device in step A, the wires being removed from a wire store.

The drawing of the wires is preferred on the basis of the weakly defined inherent rigidity thereof and enables the use of a wire hopper, e.g. in the form of a coil, on which the wire blanks, where applicable, are stored in an already pre-configured state and at an already pre-configured distance.

The wire drawing device is preferably also used, after carrying out step B or C or even, in the case of subsequently introduced wires, in the further method, for the purpose of bending the free wire ends, which are still clamped in it, in the direction of the rotational axis of the winding template for forming the winding connections with reference to the first holding region of the wires, as a result of which a fluid method sequence is achieved without additional mechanical devices.

The wires are fixed at the holding points preferably using holding devices as parts of the wire handling device. The wires can be rigidly clamped, which, however, on account of the self-locking thereof is often not necessary at all such that hardly any holding devices with actively actuatable clamping elements have to be used. It can be sufficient to place holding devices with an inherent geometry of, for example, guide channels onto the wires which then provide a sufficient hold against slipping through in the case of lateral displacement. A clamping device, which can be held on standby, for example, through the wire feed, is preferred in the second holding region.

At least two holding devices are preferably used, a first holding device being used in step B in the first holding region and the second holding device being used in the second holding region in step C. The holding devices are, however, not bound to the respective holding region but can be moved between the three holding regions such that they are able to maintain the holding action not only during their displacement but also during the rotation of the winding template.

If only two holding devices are used for the three holding regions, once the holding action in the third holding region has been lifted, the respective holding device is moved directly into the second holding region in order to clamp the subsequently guided wires there or to fix them in another manner. A more expensive mechanism and control system are necessary for this method of operation and sometimes the cycle times are also lengthened.

Consequently, a third holding device is preferably used, which third holding device engages in the method sequence for the first time in step F and clamps the adjusted wires in the second holding region. In this way, the holding action in the third holding region can be disengaged around the same time as step F and the displacement of the first holding device from the third and into the second holding region can be carried out within the framework of the next rotation of the winding template. The holding devices are entrained with rotations of the winding template from the first into the third holding region, then with the next rotation from the third into the second holding region and finally again from the second into the first holding region, from where the movement sequence is then repeated when the winding template is rotated further.

The guiding of the holding device obviously preferably also enables the individual displacement thereof parallel to the rotational axis of the winding template in order to enable the execution of steps D, H and K in the holding positions.

Two holding devices (first and third holding devices), which are coupled with the winding template with regard to the rotational movement and alternately fix the wires in the first or third holding regions, are possible as an alternative to this. The second holding device is then preferably uncoupled from the rotational movement of the winding template and is moved between the first and second holding regions, it being possible for it to describe a curved path in order always to be arranged in the vicinity of the flat winding template when it carries out its rotational movement.

The first and third holding devices are preferably moved between each of two end positions radially and axially with reference to the rotational axis of the winding template, the wires being free in a radially outer position and the wires being fixed in a radially inner position. The holding devices are moved in the axial direction up to a maximum extended end position when the displacement step D, H or K is carried out. In the oppositely situated axial end position, the retracted holding device can be moved past the wires when it is moved with the winding template from the third into the first holding region.

In a preferred further development of the method, it is provided that the winding heads are ultimately formed in the region of the bend region which is realized by the rotating of the winding template beforehand in step E or I from the angled wire region. Said forming operation can compensate for possible irregularities in the shaping of the winding heads and also serves, in particular, for the purpose of further reducing the already discussed protrusion of the winding heads beyond the stator or rotor in terms of the advantage provided anyhow in this respect according to the invention.

A forming tool, which is pressed against the winding heads, can be used here for example.

After realizing the complete coil winding, the wires are severed in step L preferably in a rotational position of the winding template in which the wire ends fed at the beginning are located on the side of the winding template on which the wire feed occurs. The achievement here is that the connections at both ends of the coil winding are located on the same side once the winding has been inserted into the stator or rotor, which simplifies its contacting.

BRIEF DESCRIPTION OF THE SEVERAL VIEWS OF THE DRAWINGS

Exemplary embodiments of the invention are described in more detail below by way of the accompanying drawings, in which:

FIGS. 1, 2, 3, 4, 5, 6, 7, 8, 9, 10, 11, 12 and 13 show a sequence of a method for producing a flat coil winding, the upper portion a in each case showing a schematic end-face view of a winding device with three rotary holding devices for carrying out the method, the middle portion b in each case showing a top view of the winding device and the lower portion c showing in each case a top view of only the coil windings already generated with said step;

FIG. 14 shows a top view of a flat winding with half the number of wires in comparison with the examples shown beforehand;

FIG. 15 shows a view of a stator, in the grooves of which the winding from FIG. 17 is received;

FIGS. 16, 17, 18, 19, 20, 21, 22, 23, 24, 25, 26, 27, 28 and 29 show a sequence of an embodiment of the method in a manner of representation similar to FIGS. 1 to 13 with the holding devices having changed kinematics.

DESCRIPTION OF SPECIFIC EMBODIMENTS OF THE INVENTION

Figure 1:
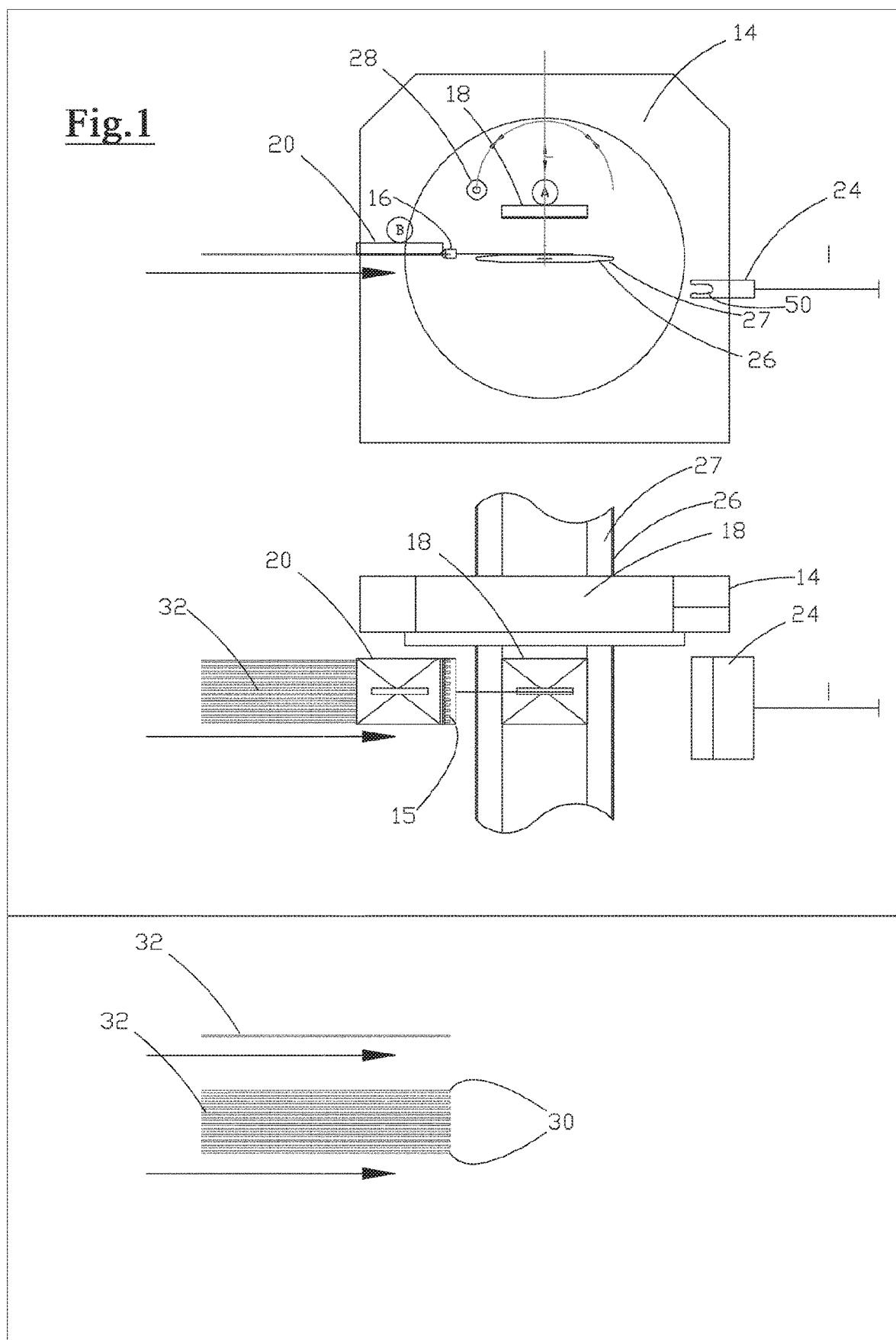

FIG. 1 shows the starting position at the beginning of a method for producing a coil winding 70 for a stator of an electric motor (not shown). To this end, in the exemplary embodiment shown, a winding device 10 is on standby, which winding device has a winding head 12 with a wire handling device 14, which comprises a wire drawing device 16, three wire holding devices 18, 20, 22 (see also FIG. 5) and a winding head forming device 24. The winding device 10 interacts with a winding template 26 which is realized as a flat template, i.e. has a strip-like shape. The cross section of the winding template 26 is clear in the upper part a of the representation in FIG. 1, from which the edge regions 27 of the winding template 26, which are tapered toward the flanks, and a radius of the flanks themselves can be seen. The length of the winding template 26, the full length of which is not shown, is determined according to the length of the coil winding 70 to be produced and to the precise configuration of the method, the length of the winding template 26 not having to correspond to the length of the coil winding 70 and it then, for example, being able to be considerably shorter than the coil winding 70 when this latter is passed on already in a gradual manner from the template to a transferring device (not shown) in the course of the method. The winding device additionally has assigned thereto a wire rolling device 28 which, during rotation, roll-forms the wires to be processed for better abutment against the winding template 26.

Figure 2:
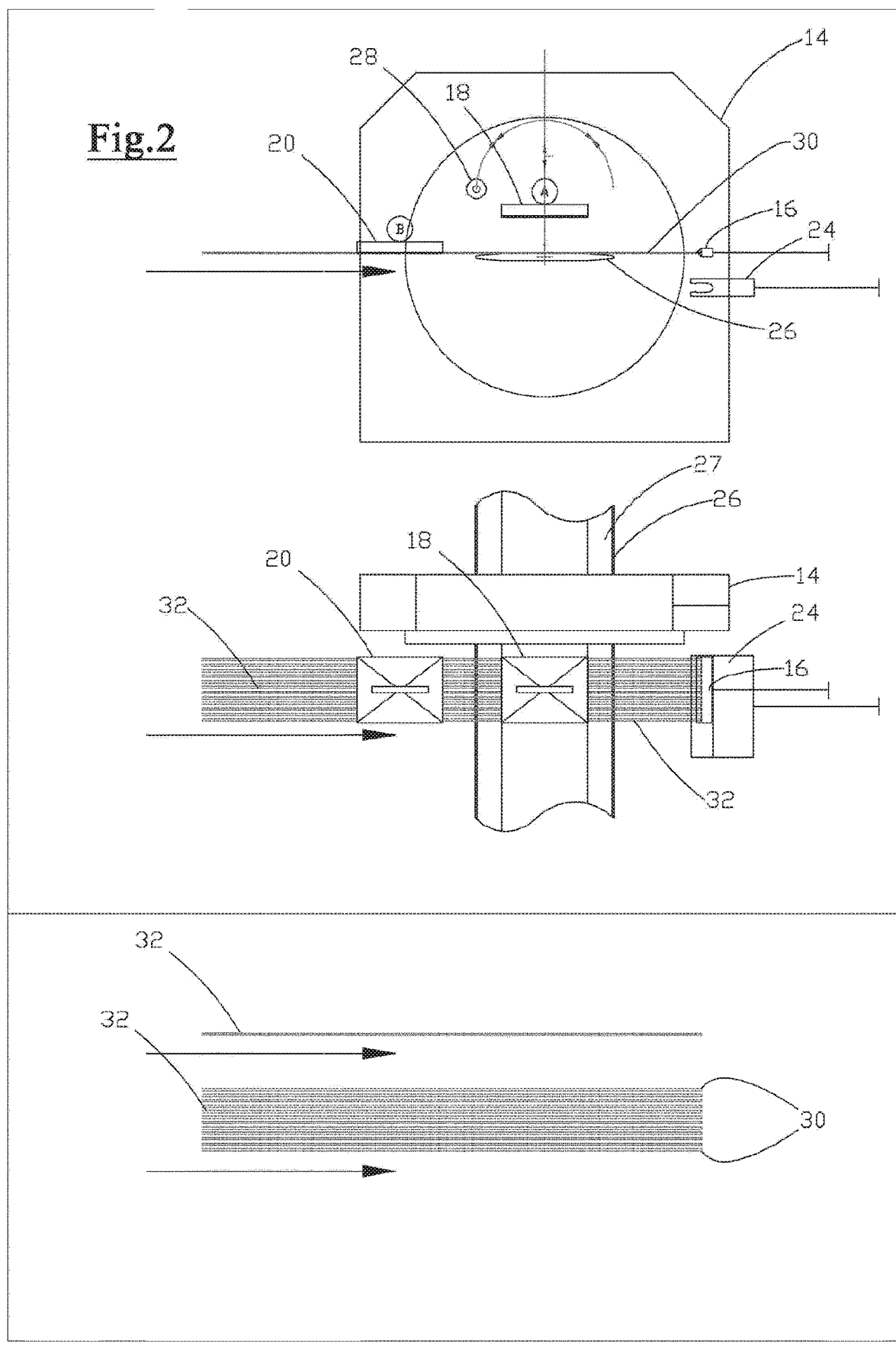

The sequence of the method is designed as follows. According to FIG. 1, a first holding device (A) 18 is situated in a waiting position at a spacing from the winding template 26. A second holding device (B) 20 is situated in a disengaged rest position such that the wire beginnings running through it are not clamped. The wire drawing device 16 is clamped with the wire beginnings 30. In the exemplary embodiment shown, 12 wires 32, which are removed from a wire store (not shown) guided parallel to one another, are processed at the same time. However, it is also possible to introduce only part of the wires into the method initially and not to introduce the remaining wires into the method sequence until later. Proceeding from FIG. 1, the wire drawing device 16 pulls the parallel bundle of wires 32 into a defined position shown in FIG. 2 such that the wire beginnings 30 protrude by a certain amount beyond the winding template 26. The wires 32, in this case, are able to pass the not yet clamped second holding device (B) in an unimpeded manner. The first holding device (A) 18 is then moved out of its rest position into a holding position in which it is moved closer to the winding template 26 or abuts against it (see FIG. 3). The triggering causes a first holding position in a first holding region 34 to be defined on the top side of the flat winding template 26. Close to the same time as the clamping of the wires 32 in the first holding region 34, the second holding device (B) 20 is triggered such that a second holding region 36 of the wires, which is located at a certain distance from the first holding region 34, is defined. The second holding region 36 is located between the wire store and the first holding region 34.

FIG. 3 additionally illustrates how the wire beginnings 30 are transferred by means of the wire drawing device 16, as a result of a sideways movement of the latter, into a bent wire portion which provides the connection point of the finished coil winding 70. A bend point 38 is defined by the first holding device 18 in the first holding region 34. The wire drawing device is then disengaged from the wire beginnings 30 and is no longer required for the remaining execution of the method in the variant described here as an exemplary embodiment. The wire drawing device is correspondingly moved into a rest position which is shown in FIG. 4.

In addition, FIG. 4 illustrates a method step where an angled wire portion 40 is generated. Said wire portions 40 subsequently form winding heads 42 between straight legs 44 which are located in grooves of a stator or rotor. The winding heads 42 will be looked at in more detail in the following method step and also subsequently. It can also be seen more easily in FIG. 4 than in FIG. 3 that the second holding device is moved closer to the winding template 36 by the displacement step because the length of the angled portion has to correspond to the distance between the first holding device 34 and the second holding device 36 in FIG. 3. Said adjusting movement is guided and can be effected by an active adaptation or by a passive compensation movement.

Figure 5:
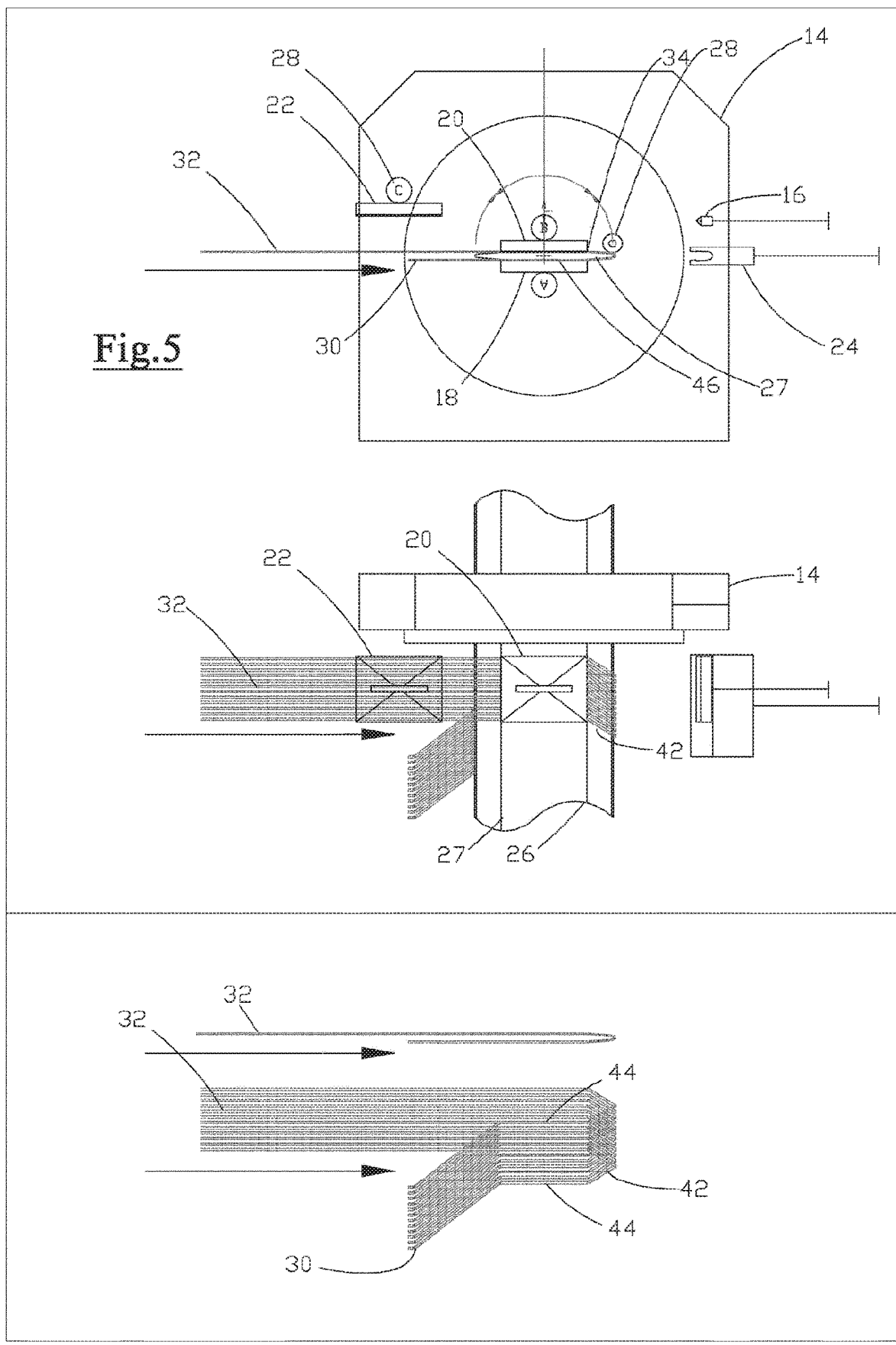

After the step shown in FIG. 4 of the displacement of the wire portion fixed in the first holding region 34 relative to the wire portion fixed in the second holding region 36 thereby realizing the angled wire portion 40, the rotary device 28 is activated and rotates the winding template 26 and the first holding device (A) 18, which is also coupled with it in the direction of rotation, out of the first holding region 34 into a third holding region 46 which is shown in FIG. 5, the second holding device (B) 20, which is clamped with the wires 32 in an unchanged manner, being entrained out of the second holding region 36 into the first holding region 34 and, in this case, further wire of the wires 32 also being removed from the wire store.

The angled wire portion 40 is transferred by the rotation of the winding template into the already mentioned roof-shaped winding heads 42 because the wires cling to the flanks of the winding template 26, the winding heads 42 tapering toward turning points 48 corresponding to the form of the edge regions 27 and bending radii being realized at the turning points 48 themselves.

The third holding device (C) 22, which is still situated here, however, in a rest position because it does not engage in the method sequence until later, is also shown for the first time in FIG. 5.

FIG. 6 illustrates an optional step in which the winding heads 42 generated beforehand obtain a final form by means of the wire forming device 24. The wire forming device 24 has a forming element 50 which is realized as a negative form of the winding heads 42 in their desired end form and is pressed against the winding heads 42 under pressure.

For preparing the next method steps, the third holding device (C) 22 is moved into the second holding region 36. The first holding device (A) 18 can also already have been disengaged but can also remain clamped with the wires 32 in the third holding region 46 over the next method step.

The next method step, which is shown in FIG. 7, once again provides the realizing of an angled transfer region 40 between the holding point generated beforehand by triggering the third holding device (C) 22 in the second holding region 36 and the second holding device (B) 20 which is still clamped and is still situated in the first holding region 34. This is effected once again by relative axial displacement of the clamped holding devices (here B and C) in the first and second holding regions 34, 36 parallel to the rotational axis of the winding template 26. Insofar as the third holding device (C) 22 is still clamped, which can be advantageous for reasons of stabilizing the part of the coil winding 70 already generated, the holding device (here A) in the third holding region 46 is moved axially together with the holding device (here B) in the first holding region relative to the holding device (here C) in the second holding region 36.

Figure 8:
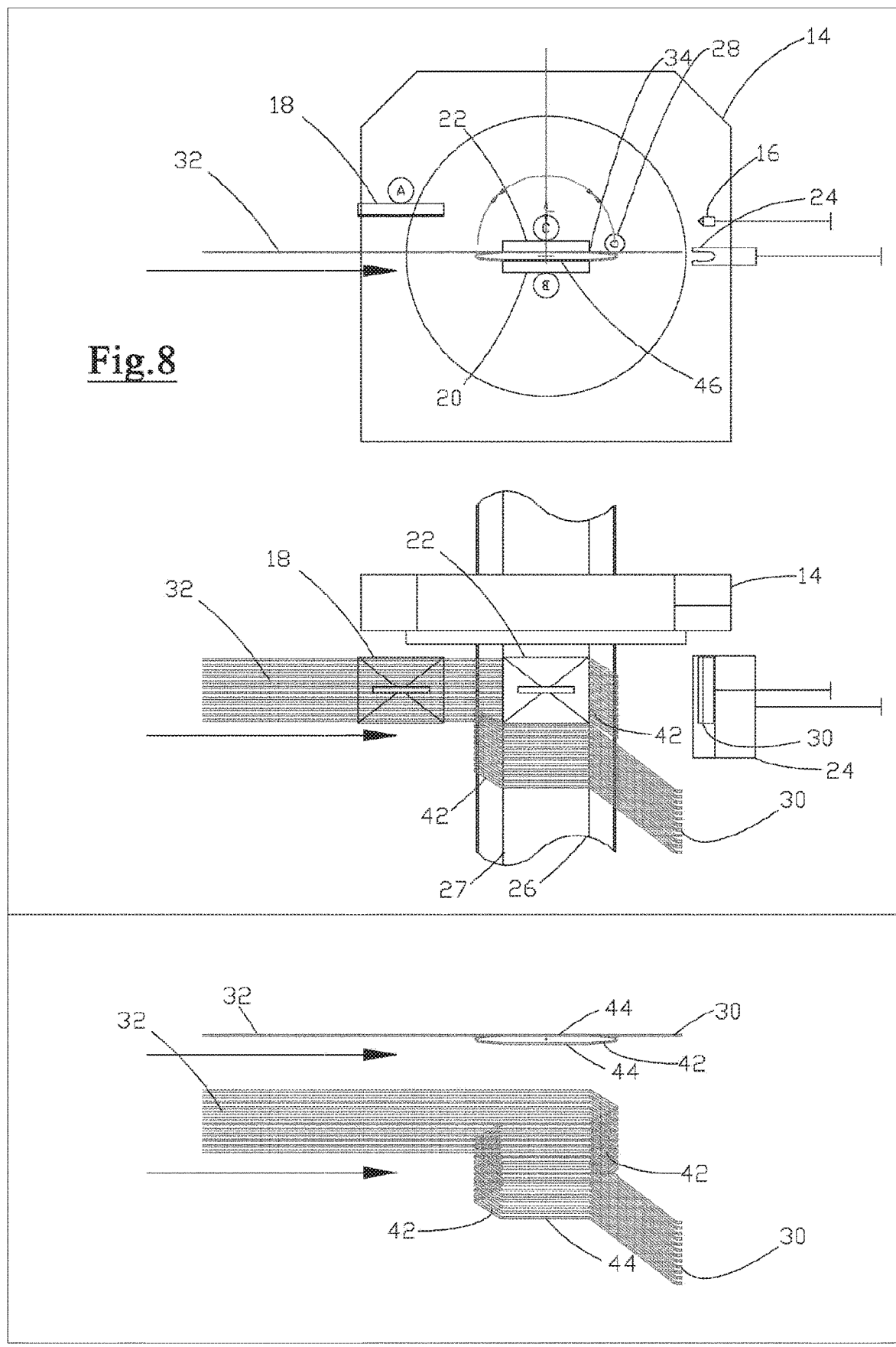

It can be seen in part c of FIG. 7 that after said step, a first portion 52 of parallel legs 44, generated in the step according to FIG. 4, is situated in lateral offset to the wires 32, removed in parallel from the wire feed, on the underside of the winding template 26. This means that in the case of the subsequent renewed execution of a winding operation by 180° as a result of corresponding rotation of the winding template 26, the generated first wire portion does not get in the way of following wires. Apart from this, the statements concerning FIG. 5 also apply analogously to the winding operation according to FIG. 8, the holding devices 18, 20, 22, however, being situated in other holding regions in each case. FIG. 8c shows a complete first turn of the subsequent coil winding on the winding template 26 with winding heads 42 on both sides of the straight legs 52, which are subsequently located in the grooves of the stator or rotor. Following, once again, as illustrated in FIG. 9, is an optional step of forming the winding heads 42 by means of the forming element 50 of the wire forming device 24, which has already been explained in conjunction with FIG. 6, in order to optimize the shaping of the winding heads 42.

Figure 9:
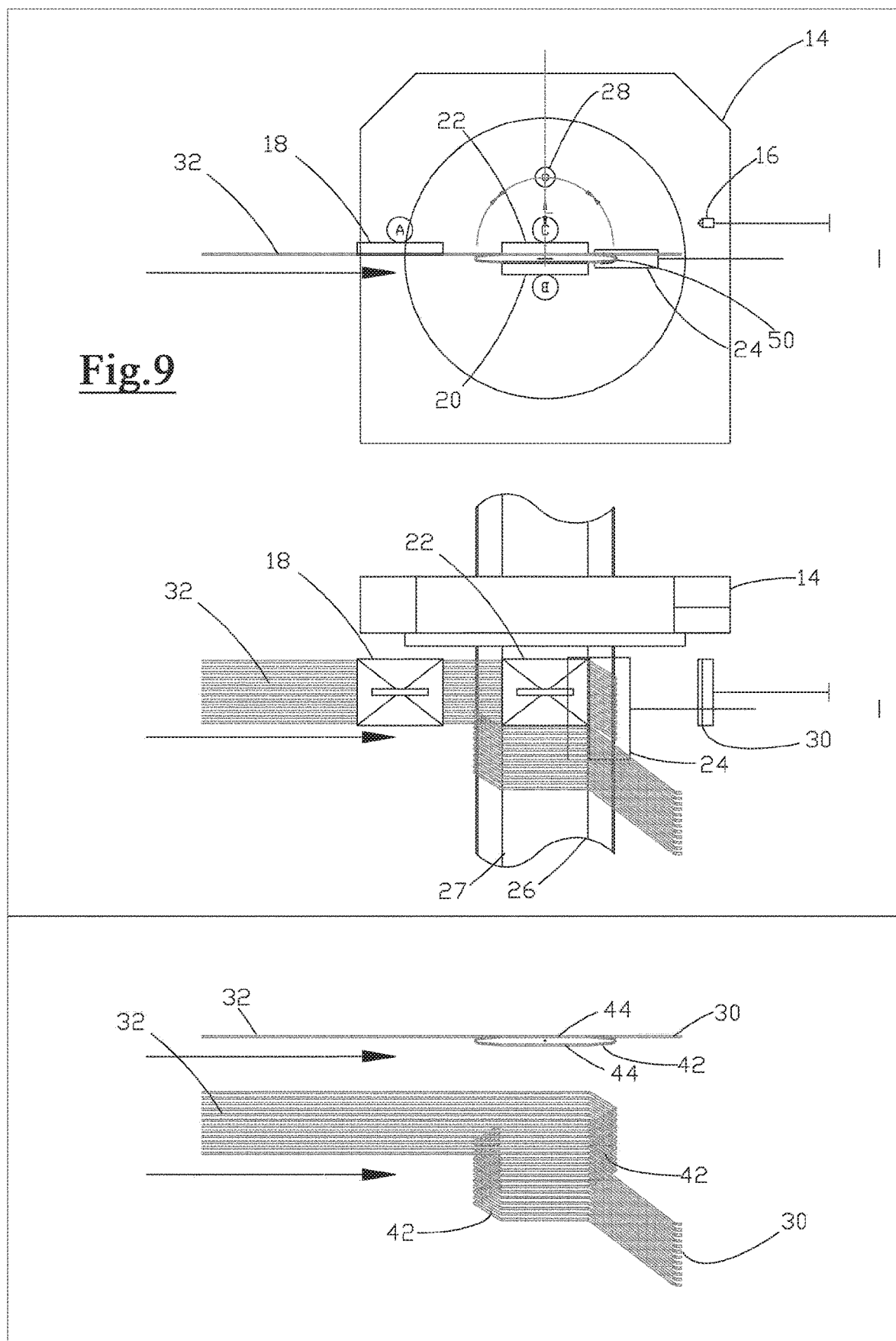

The method steps shown in FIGS. 4 to 9 are then repeated corresponding to the number of necessary turns of the coil winding 70, the arrangement of the holding devices 18, 20, 22, however, changing and not always corresponding to the position of the holding devices shown there as they change their relative position after each pass, as can easily already be seen by the expert from the different arrangement in FIGS. 4 to 6 on the one hand and FIGS. 7 to 9. The sequence is repeated, however, in an obviously regular manner such that with each third winding operation by 180°, the holding devices 18, 20, 22 return back into their respective positions.

As an alternative to this, the method is also able to be carried out with only two holding devices, the holding device displaced with the rotating/winding operation into the third holding region then being moved back immediately into the second holding region again in order to fix the just adjusted wires 32 there prior to carrying out the displacement operation to generate an angled wire portion 40.

Figure 10:
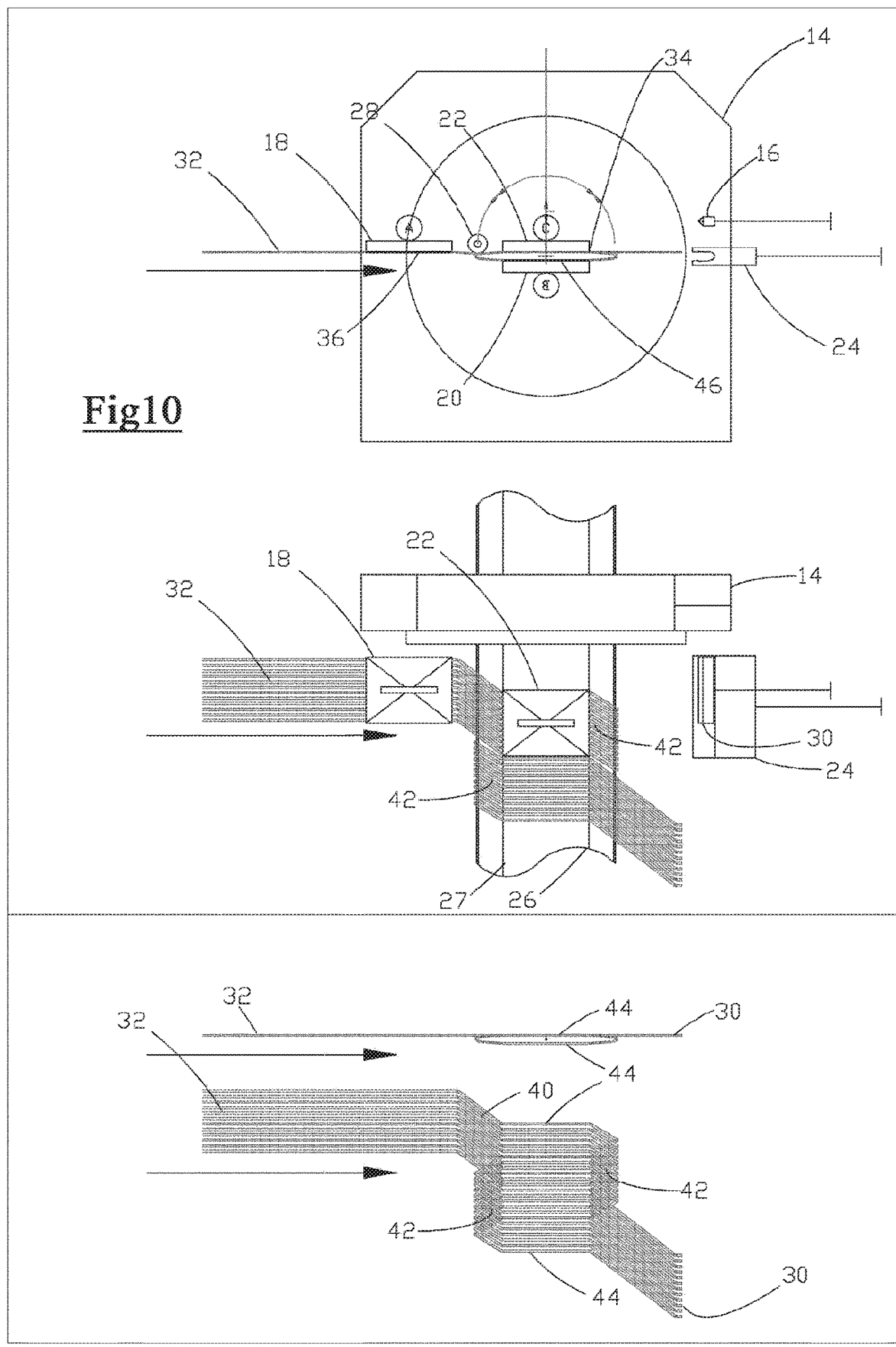
Figure 12:
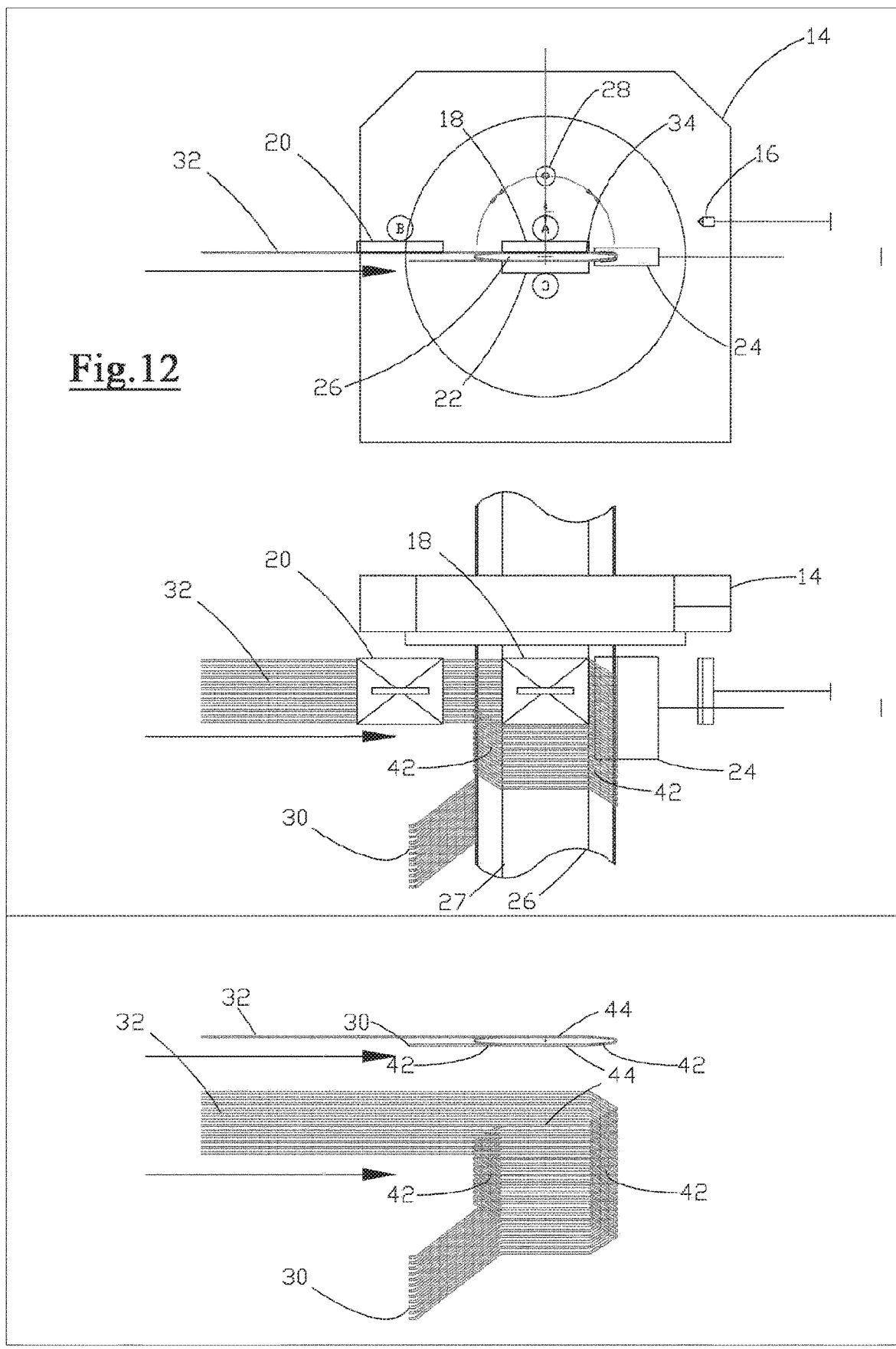

The final method steps to produce the coil winding, which are carried out in a manner deviating from the recurring method steps, are illustrated in FIGS. 10 to 13, the method steps from FIGS. 10 to 12 showing the repeat of the sequence of displacement, rotating/winding and (optional) forming of the winding heads 42, as is also run in FIGS. 4 to 6 and FIGS. 7 to 9.

Figure 13:
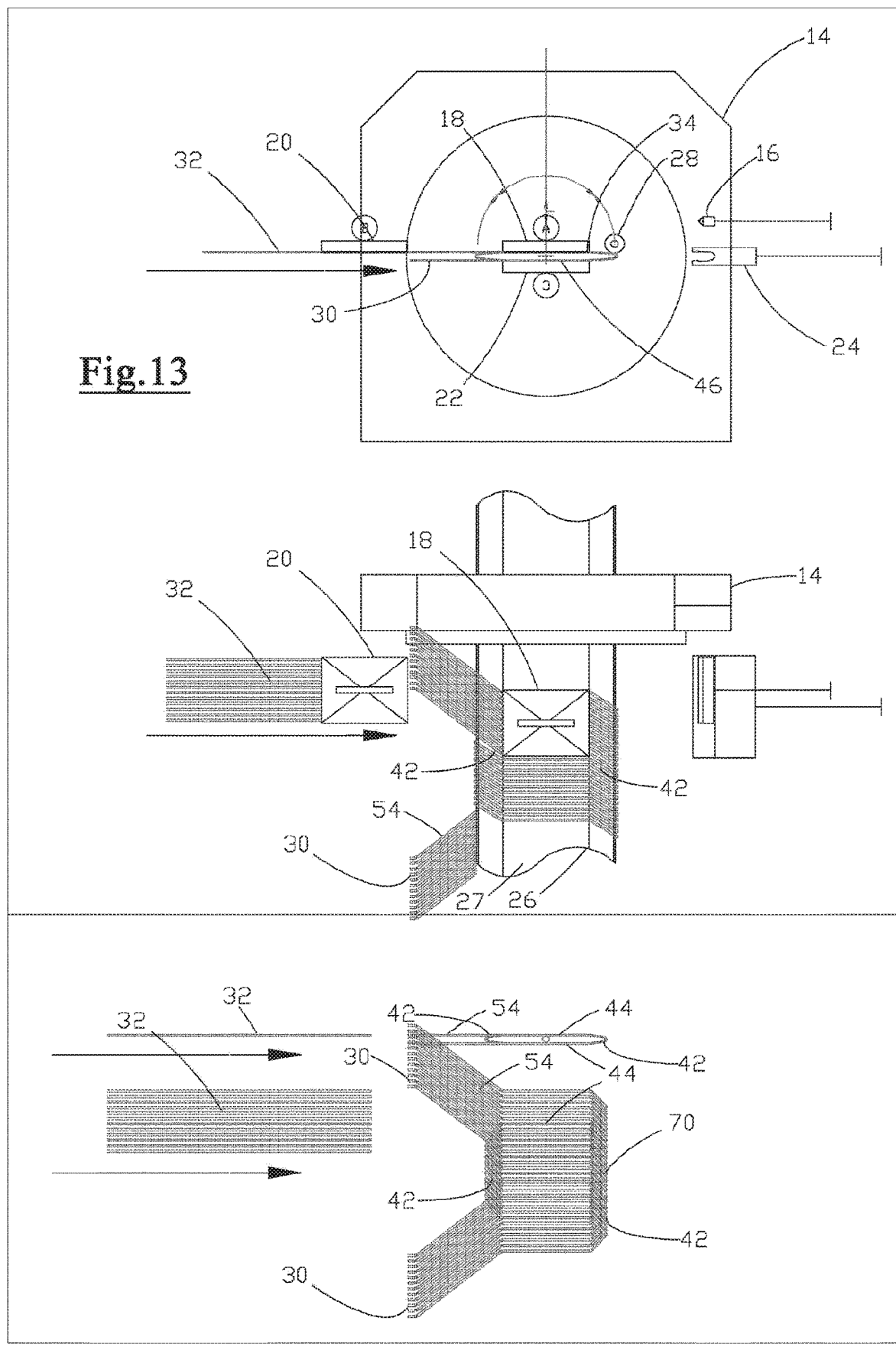
Figure 18:
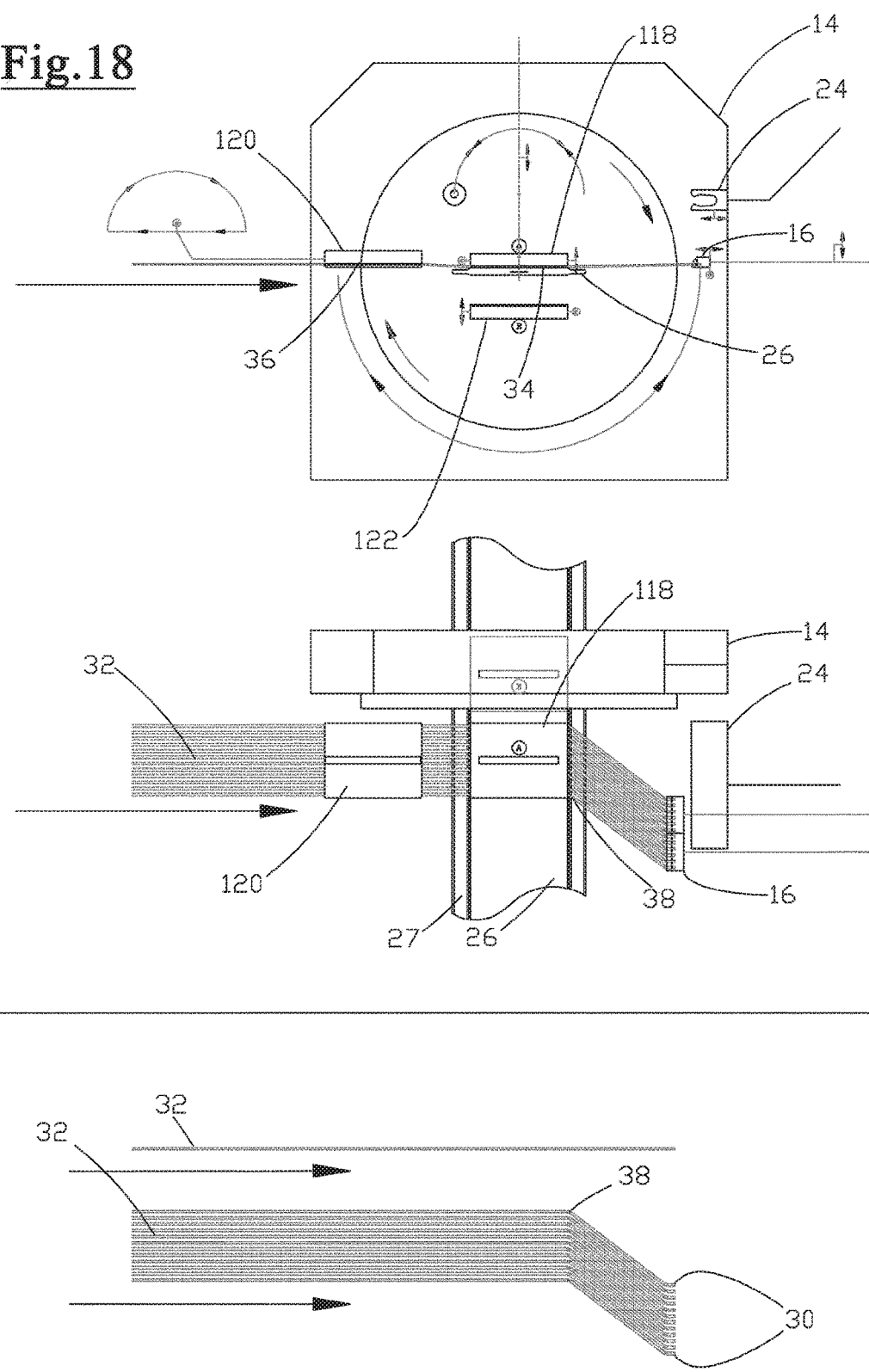

The final step to produce the complete coil winding 70 is shown in FIG. 13. At this point in time, a number of straight legs 52 have been generated corresponding with what is desired for equipping the rotor or stator grooves. In FIG. 13, however, for the purposes of better clarity, only a shortened coil winding 70 is shown. It is intended in the case of the exemplary embodiment shown that all the connecting wires of the finished coil winding 70 are located on one side, correspondingly the step from FIG. 13 is then carried out when the wire beginnings 30 are located on the side of the wire feed.

Before the finished coil winding 70 is severed from the wire store by means of the cutting device (not shown), first of all there is a final displacement of the first holding region (here once again using the clamped first holding device (A) 18) relative to the second holding region (here holding device (B) 20) parallel to the rotational axis of the winding template 26. Once the wires have been cut off, the wires angled with reference to the legs 52 form wire ends 54 which, just as the wire beginnings 30, serve as electric connections for the coil winding 70.

Once the wire ends 54 have been cut from the wire store, the finished coil winding 70 is then transferred in a manner known per se into the stator or rotor, it firstly being stripped from the winding template and, where applicable, inserted in an intermediate step into a transferring device.

The method is not fixed, in particular, with regard to the number of parallel processed wires which in the exemplary embodiment shown and described is specified at twelve. Any arbitrary even number of wires can be processed in parallel for a distributed wave pattern of the coil winding 70. For the case where a non-distributed wave pattern is to be produced for a winding, the method is suitable, however, for practically any arbitrary number of wires. As already mentioned, the method is conceived, in particular, for the production of coil windings 70 produced from flat wires which have a rectangular cross section.

FIG. 14 shows a pre-fabricated winding 70 in the flat state, said position corresponds to the state in which the winding 70 rests on the strip-shaped template 26, but which is not shown. The winding 70 shown in FIG. 14 is certainly only a winding with in each case six connecting wires which are formed by the wire beginnings 30 and the wire ends 54, i.e. in this case X is 3. Nothing is changed in the basic method of operation of the method, simply that twelve parallel wires are not fed but just six. The axial path during displacement and realization of the angled transfer regions 42 between the straight wire portions 44 is correspondingly reduced.

FIG. 15 shows, as an example, a stator 80 into which the winding 70 is inserted in stator grooves 82. The connecting wires formed by the wire beginnings 30 and the wire ends 54 at the start and at the end of the winding are located on one side of the stator 80, which facilitates their connection. It can also be seen in the exemplary embodiment shown that the length of the stator winding 70 is a multiple of the circumference of the stator 80, in the case of the exemplary embodiment shown double the length. In particular, in the case of rectangular cross sections, with stators produced in such a manner, excellent filling degrees of the grooves 82 can be achieved such that the compactly designed motors have a high performance. The winding heads 42, which are flattened as a result of the displacement, ensure that material consumption is low and an axial installation space for the rotor is small.

FIGS. 16 to 29 present a winding device 110 which provides deviating kinematics, in particular with regard to the three holding devices 118, 120, 122, apart from that, however, enables a substantially concurring method progression. The individual steps shown consequently correspond as far as possible to FIGS. 1 to 13 in the same sequence, an intermediate step having been shown additionally in FIG. 20 in order to illustrate the deviating kinematics. As many parts of the winding device 110 are identical or functionally similar to the winding device 10 described beforehand, the majority of reference symbols have also been left identical.

The essential difference between the winding device 110 shown from FIG. 16 and the winding device 10 proposed in FIGS. 1 to 13 is that there are not three holding devices which are realized more or less identically, for example as clamping devices, being used, which are used in a type of pass one after another in all three holding regions 34, 36 and 46, but rather the first and the third holding devices 118 and 122 are coupled with the winding head 12 in the direction of rotation. A movement of the first and third holding devices 118 and 122 is effected in the radial and axial direction with reference to the rotational axis of the winding template 26.

The second holding device 120 is realized as a wire laying device and does not rotate with the winding template 26. Nevertheless, the wire laying device, which also enables the wires 32 to be tightly clamped in their engagement region, carries out an arcuate movement during the feed movement in the direction of the winding template 26 in order, on the one hand, not to collide with the winding template 26 and, on the other hand, to be able to put the wire as close as possible to the winding template 26, whilst the return movement is effected in a linear manner, but this is not compulsory. More details in this respect will be given in conjunction with the description of FIGS. 16 to 29, the movement sequence X, however, is also illustrated in the individual representations.

FIG. 16 shows the position of all parts of the winding device 110 which correspond to the method state in FIG. 1. The first and third holding devices 118 and 122 are situated in an axial rest position retracted fully into the winding head 12, in which they release the space around the winding template 26, this not being absolutely necessary in order to carry out the following method steps. The wire laying device as second holding device 120 is situated in a disengaged rest position, i.e. the wire beginnings 30 running through it are once again not clamped with it or fixed with it in any other way. The simultaneous processing of all the wires is shown here once again too as an example, gradual feeding of the wires in the course of the method also being possible.

As in the case of the embodiment described previously, proceeding from FIG. 16 the wire drawing device 16 pulls the parallel bundle of wires 32 into the position shown in FIG. 17 where the wire beginnings protrude beyond the winding template 26 by a certain amount, passing the wire laying device. The first holding device is then positioned axially above the wires 32 and is then lowered radially toward the winding template 26 such that the wires are fixed in the region of the legs 44 to be realized (see FIG. 18). The wire drawing device then moves parallel to the rotational axis of the winding template 26 to realize the bent connecting lugs of the subsequent winding 70. The next step to the state shown in FIG. 19 consists, once again, in an axial displacement of the first holding device 118 relative to the second holding device 120 in order to generate the angled wire portion 40, the path being equal to half the width of the entire wire bundle irrespective of the number of wires just processed.

Figure 20:
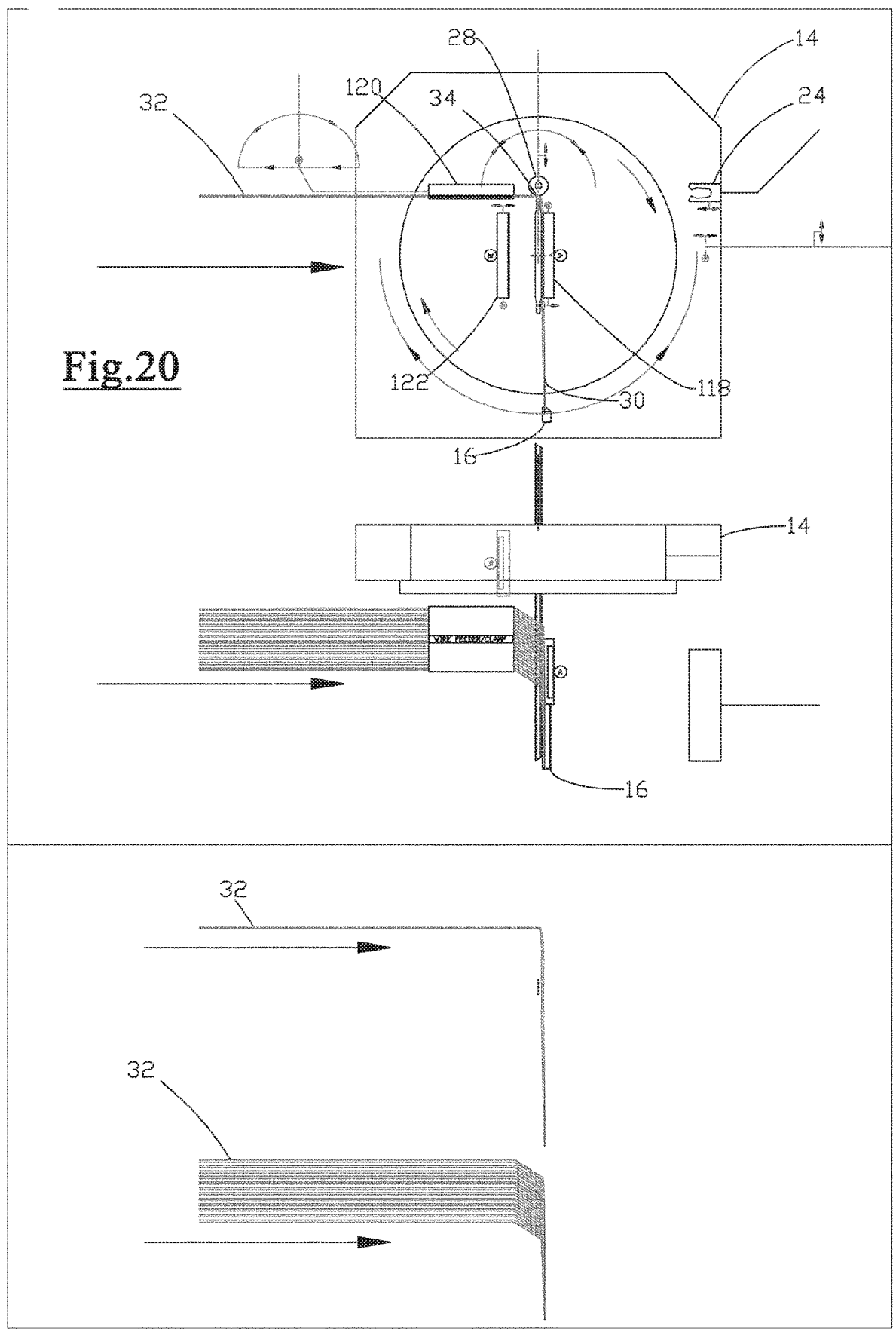

For better understanding of the following winding operation whilst realizing the winding heads 42, FIG. 20 shows an intermediate step in which the winding template 26 has first of all been rotated by 90°. It is easy to see that the first holding device 118 still fixes the wires 32 on the winding template 26, i.e. remains in the position offset axially by half the width. The wire roll-forming device 28 ensures that the wires cling to the basic form of the winding template during the rotation whilst the wire laying device, as second holding device 120, remains axially in the same position and describes an arcuate path during the rotation of the winding template 28 which is produced when the tip of the wire laying device follows the outer contour of the rotating winding template 26.

Figure 21:
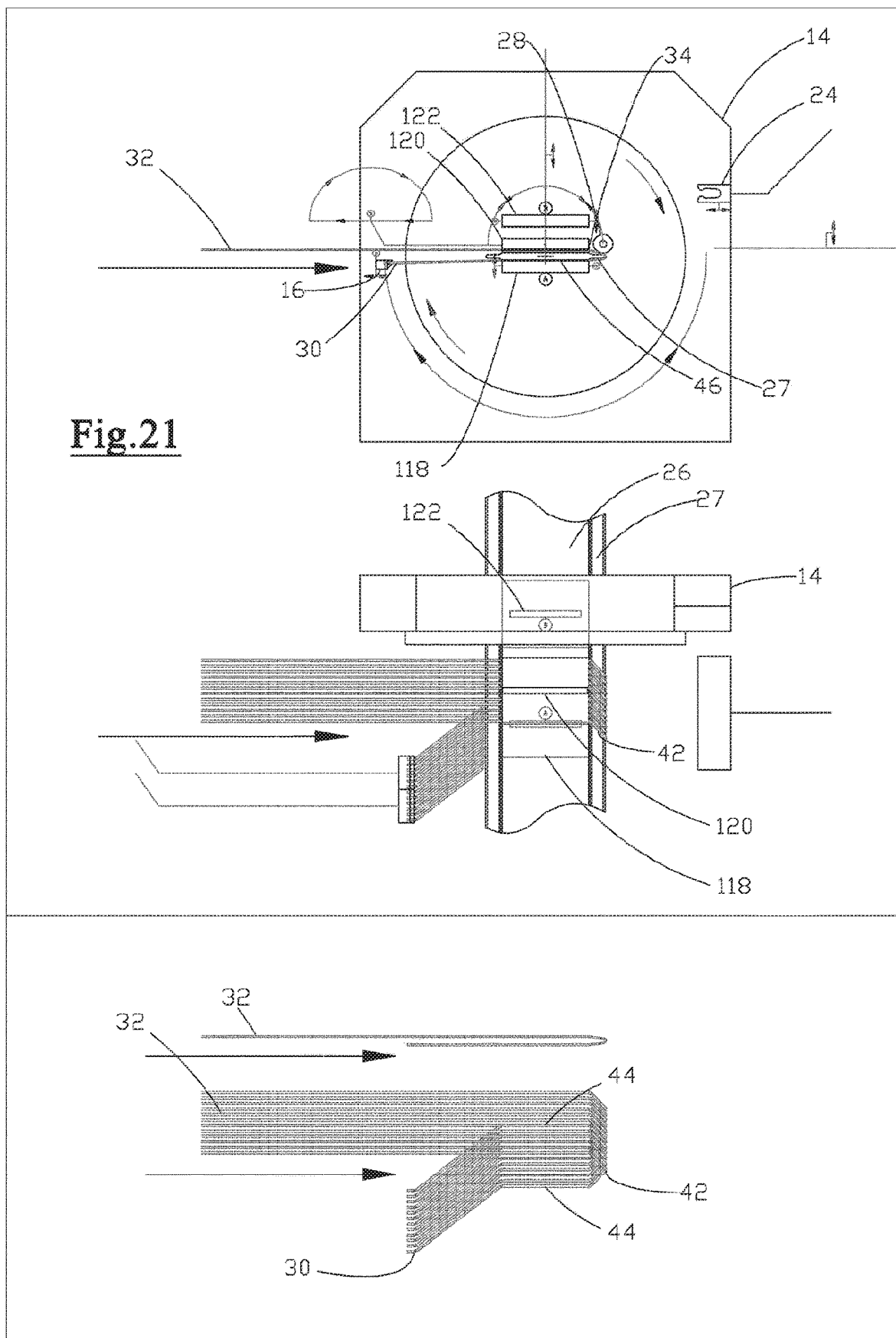
Figure 22:
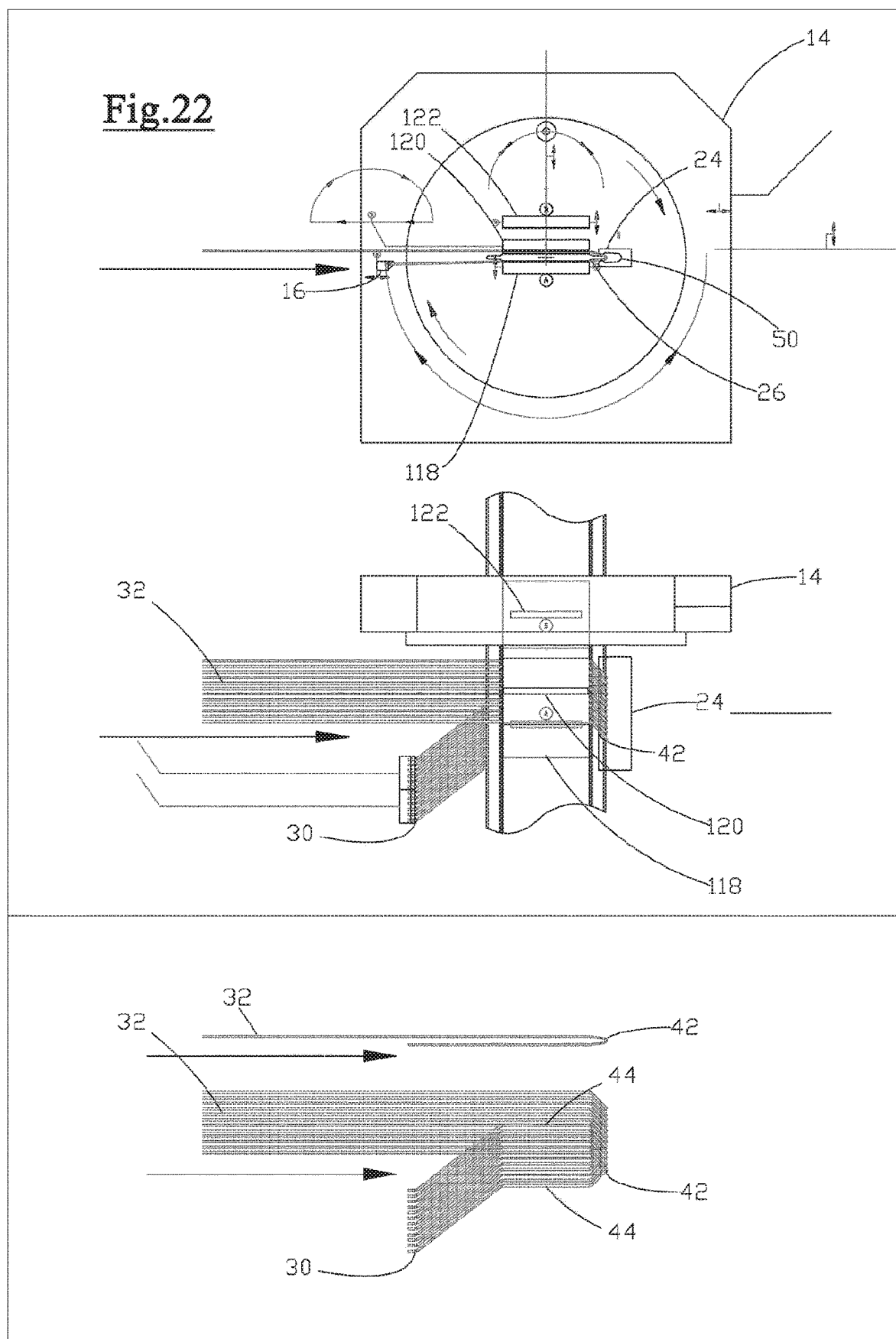

The third holding device 122, during the rotation illustrated in FIGS. 20 and 21, is situated in an axially retracted position and can be retracted, for example, completely into the winding head. As a result, it evades the wire laying device and the wires 32 which are situated in the vicinity of the winding template.

Attention should also be paid to the fact that, deviating from the method of operation of the winding device 10 shown in FIGS. 1 to 13, the wire drawing device here remains clamped with the wire ends 30 and correspondingly follows the rotating movement of the winding template 26. The wire drawing device stabilizes the wires 32 and serves as additional support ensuring that they are not unintentionally displaced or deformed under the effect of the force during winding. Said measure can also be used readily apart from this in the case of the winding device 10 described beforehand.

At the closure of the rotation for realizing the winding heads 42, the wire laying device, as second holding device 120, is situated on the side of the winding template 26 located opposite with reference to the first holding device 118 (see FIG. 21). The operation for forming the winding heads 42 by means of the wire forming device 24 already shown in FIG. 6 follows, the wire laying device then being disengaged from the wires 32 and moved back into the starting position where it fixes the wires 32 once again by being clamped with them for example. The third holding device 122 is lowered in the direction of the winding template 26 for fixing the wires 32 as soon as the wire laying device (second holding device 120) has released the space above the winding template 26.

Figure 19:
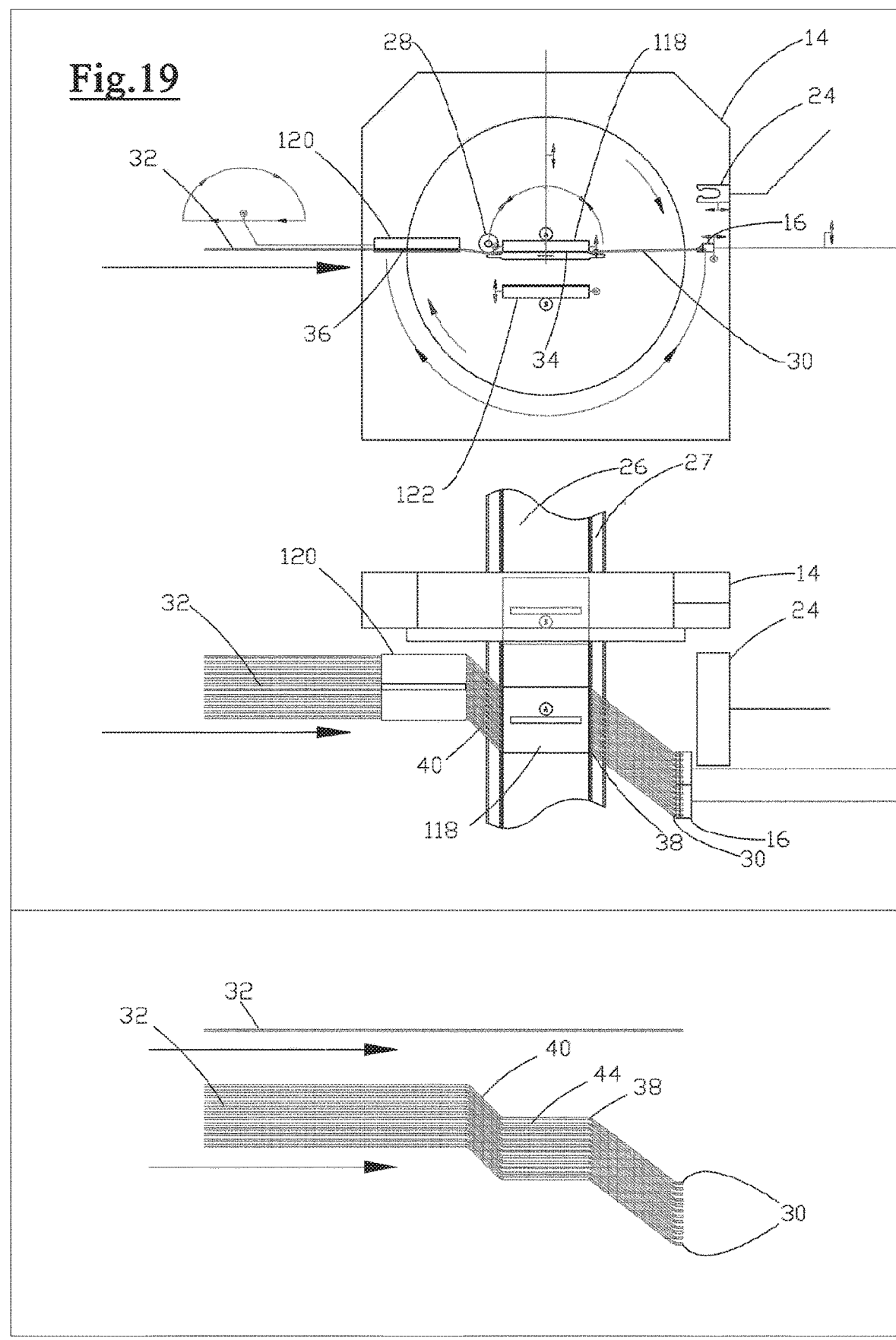
Figure 23:
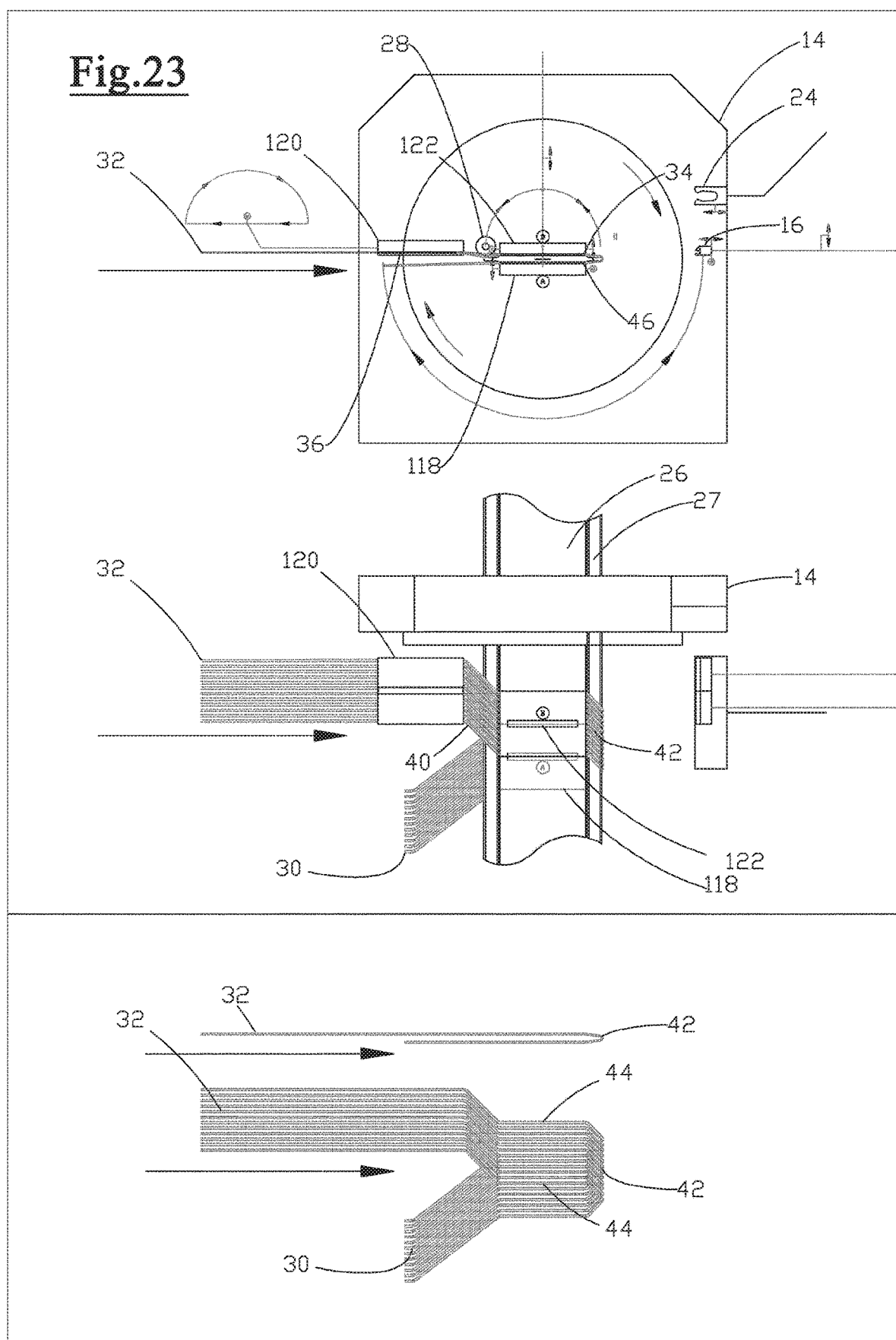
Figure 24:
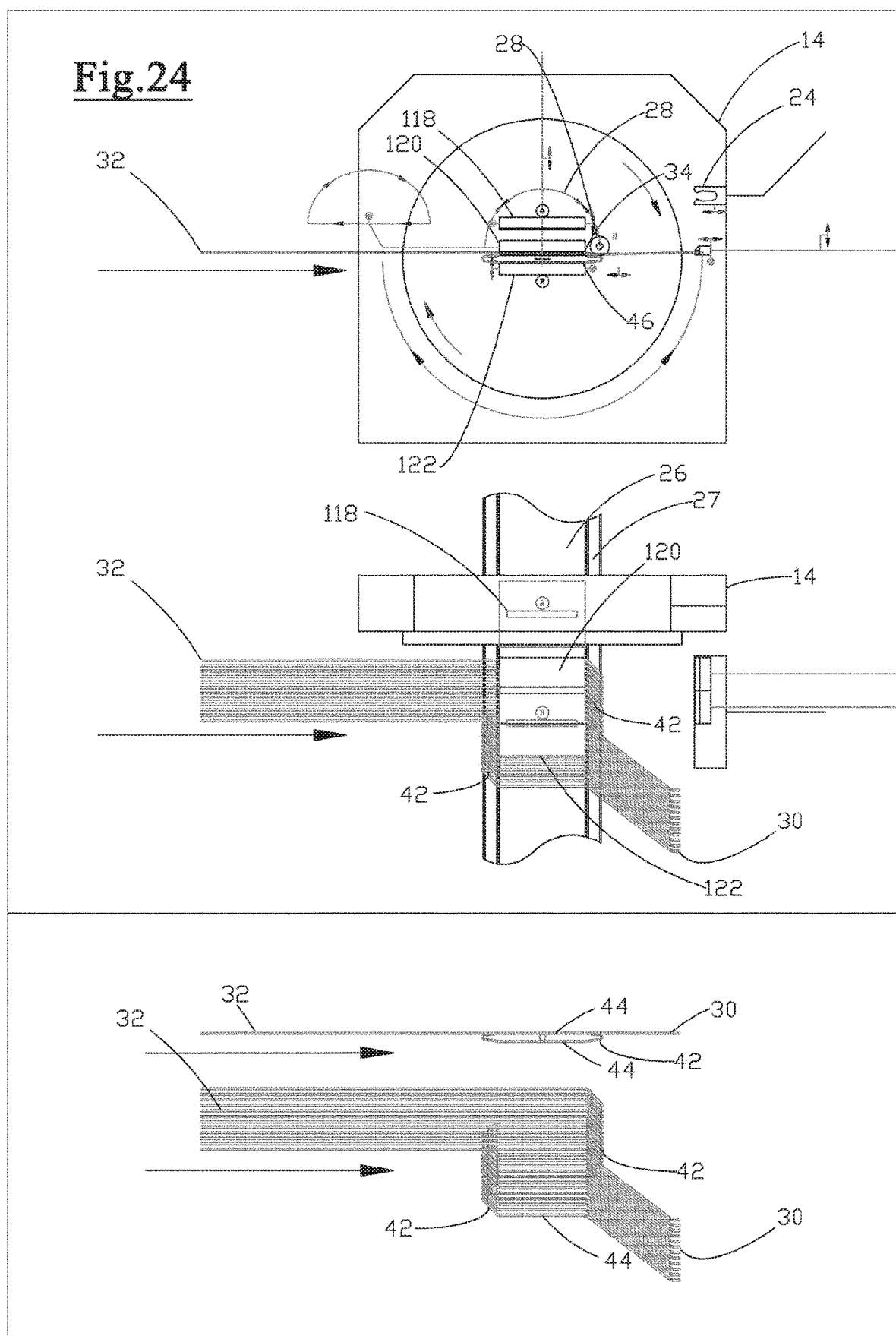
Figure 25:
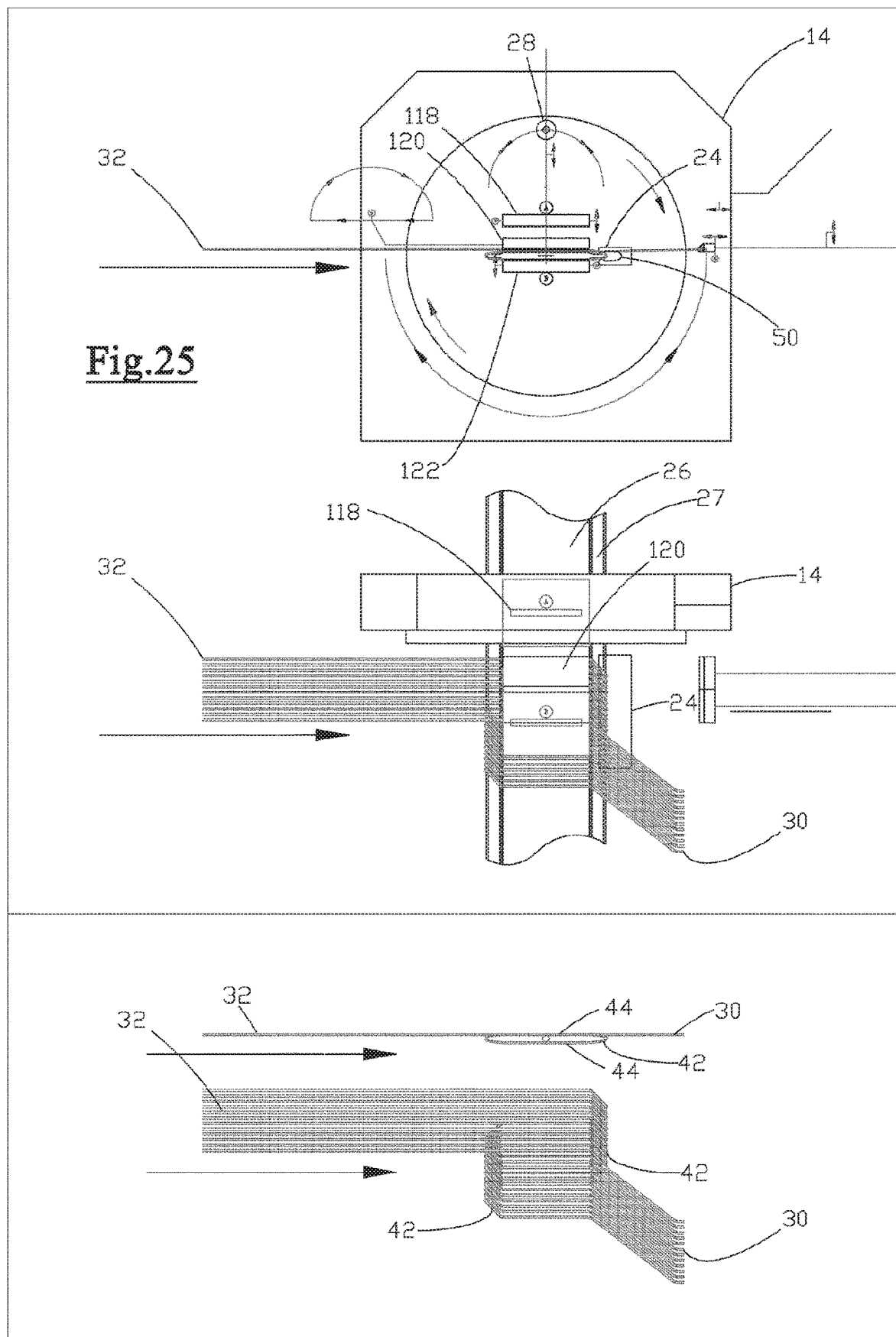
Figure 26:
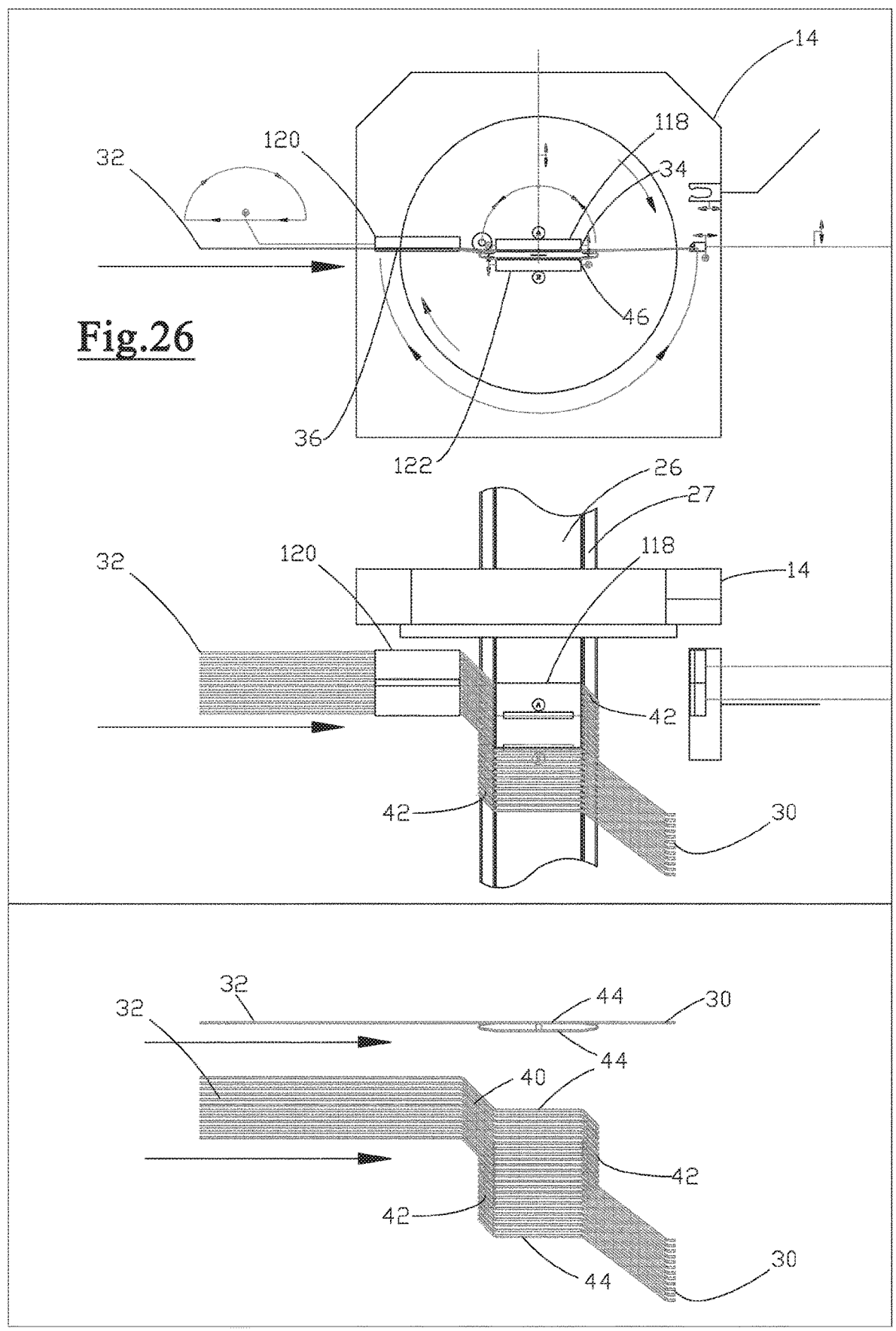
Figure 27:
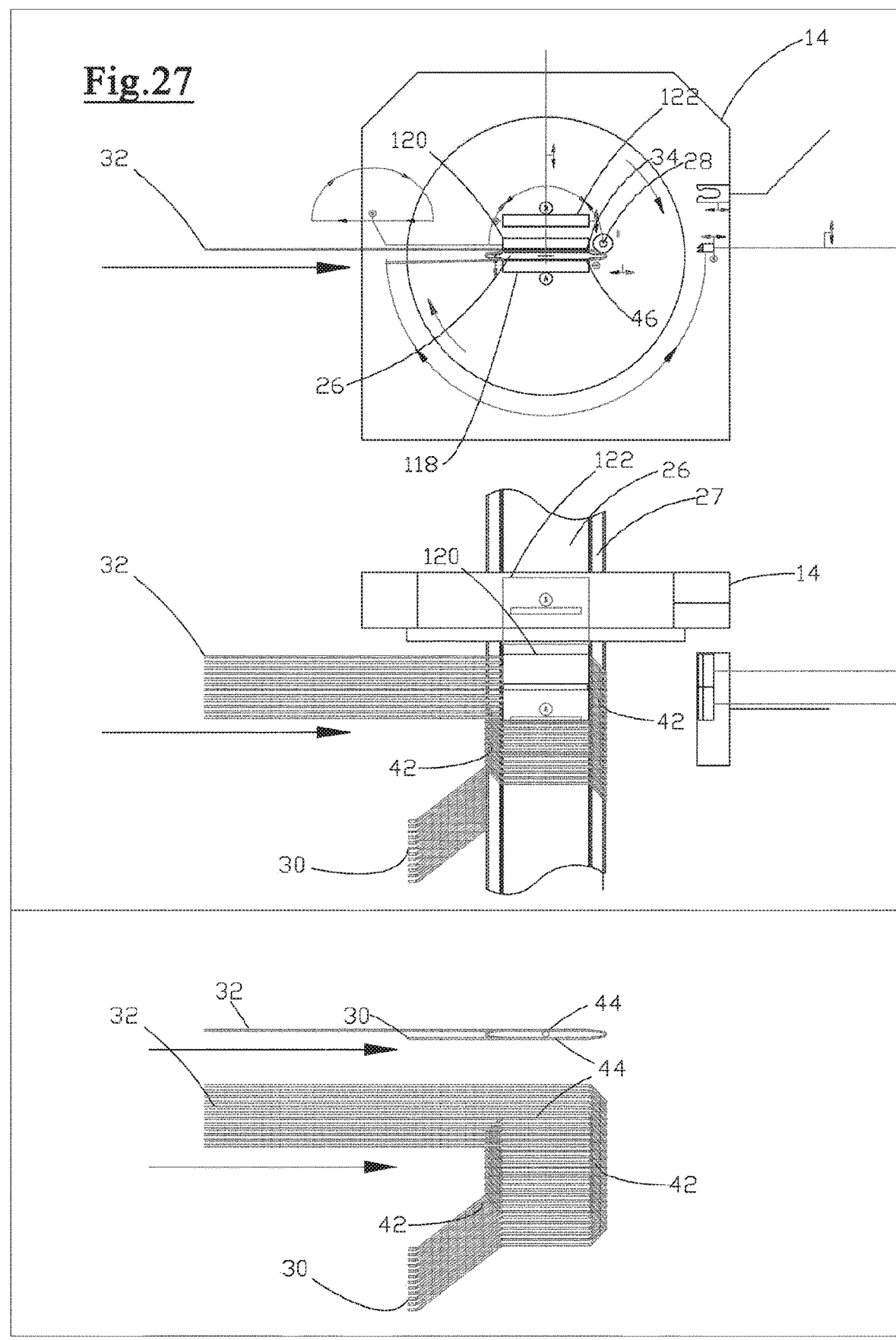
Figure 28:
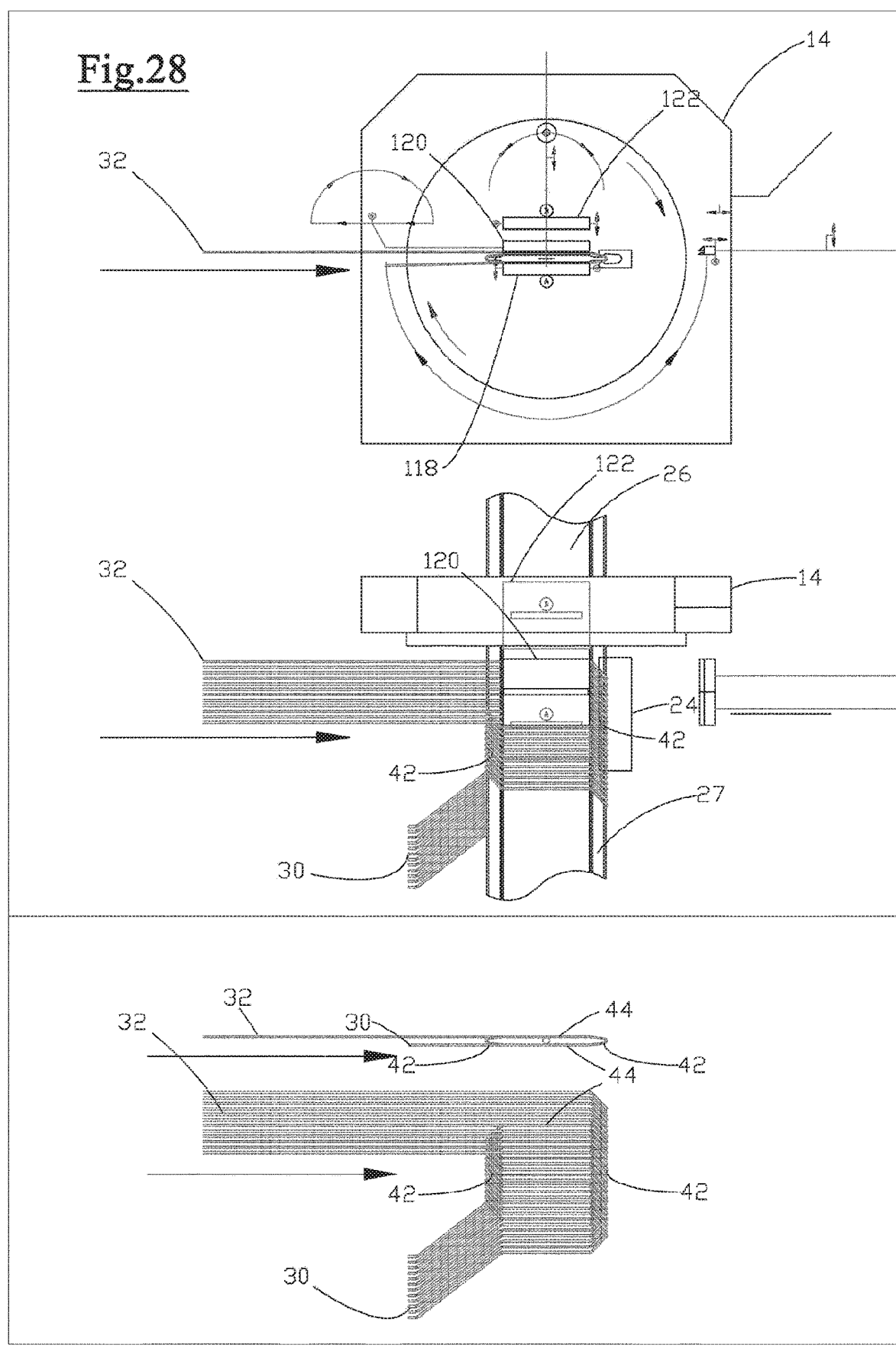

The next displacement step by half the width of the wire bundle is then able to be carried out, at the end of which the state shown in FIG. 23 is produced where the legs 44 from the first displacement step according to FIG. 19 are then located axially next to the fed wires 32 with reference to the rotational axis of the winding template 26. A further winding operation according to FIG. 24 and a wire forming operation according to FIG. 25 follow, the operations of displacing, winding and forming being repeated until the desired winding 70 is realized, except for the steps shown in the final sequence according to FIGS. 26 to 29 which correspond to the steps according to FIGS. 10 to 13, providing that the kinematics of the holding devices 118, 120, 122 are realized as described beforehand and as shown from FIG. 16.

As is clear from the two exemplary embodiments, the method can be carried out with different devices. Correspondingly, the invention is not restricted to one of the aforementioned embodiments but is convertible in diverse ways.

All features and advantages proceeding from the claims, the description and the drawing, including structural details, spatial arrangements and method steps, can be essential to the invention both on their own and in the most varied combinations.

LIST OF REFERENCES

10: Winding device
12: Winding head
14: Wire handling device
16: Wire drawing device
18: First holding device (A)
20: Second holding device (B)
22: Third holding device (C)
24: Winding head forming device
26: Winding template
27: Edge region (of the winding template)
28: Wire rolling device
30: Wire beginnings
32: Wires
34: First holding region
36: Second holding region
38: Bend point
40: Angled wire portion
42: Winding head
44: Leg
46: Third holding region
48: Turning point
50: Forming element
52: First portion of parallel legs
54: Wire ends
70: Coil winding
80: Stator
82: Stator grooves
110: Winding device
118: First holding device
120: Second holding device
122: Third holding device

What is claimed is:

1. A method for producing a coil winding (70) for inserting into radially open grooves (82) of stators (80) or rotors of electric machines, wherein the coil winding (70) consists of a number of wires (32) which are intertwined together and are bent round multiple times in opposite directions such that legs (44) of the wires (32), which lie parallel to one another and are intended for filling out the grooves (82), are connected by means of winding heads (42) which protrude at the front end beyond the rotors or stators (80), wherein a flat and rotatable winding template (26) and a wire handling device (14) are used, characterized by the following method steps:

A. feeding all the wires (32) which are used for the coil winding (70) in parallel in a direction perpendicular to a rotational axis of the winding template (26);
B. holding the wires (32) on the winding template (26) at a fixing point in a first holding region (34) of the legs (44) to be realized;
C. holding the wires (32) at a distance in front of the winding template (26) with reference to the feed direction at a fixing point in a second holding region (36);
D. prior to a first rotation of the winding template after step E), displacing the first holding region (34) of the winding template (26) relative to the second holding region (36) parallel to the rotational axis of the winding template (26) such that a distance between the first and the second holding regions (34, 36) is equal to half a distance of the outermost wires with reference to all the wires and as a result of the displacing of the first holding region (34) a wire portion (40), which is angled with reference to the legs (44), is formed between the first and the second holding regions (34, 36);
E. after a preceding displacement according to D), rotating the winding template (26) by 180° thereby adjusting the wires (32), wherein the fixing point from the first holding region (34) is displaced into a third holding region (46) on the side of the winding template (26) located opposite the first holding region (34) and the fixing point from the second holding region (36) is displaced into the first holding region (34);
F. fixing the adjusted or subsequently fed wires (32) at the fixing point n the second holding region (36);
G. disengaging the holding action in the third holding region (46) prior to or after step F);
displacing the first holding region (34) relative to the second holding region (36) parallel to the rotational axis of the winding template (26) such that a distance between the first and the second holding regions (34, 36) is approximately equal to or equal to half the distance of the outermost wires, and as a result of the displacing of the first holding region (34) the wire portion (40) is formed;
I. rotating the winding template (26) by 180° thereby adjusting and/or first-time feeding the wires (32), wherein, once again, the fixing point in the first holding region (34) is displaced into the third holding region (46) on the side of the winding template (26) which is located opposite the first holding region (34) and the fixing point in the second holding region (36) is displaced into the first holding region (34);
J. repeating steps F) to I) until the coil winding (70) is complete;
K. displacing the first holding region (34) for the last time relative to the second holding region (36) parallel to the rotational axis of the winding template (26) by an amount, the length of which is approximately equal to or equal to half the distance of the outermost wires, as a result of which the wire portion (40) which is angled with reference to the legs (44) is formed between the first and the second holding region (34, 36);
L. severing the wires (32) in the region of the second holding region (36);
M. striping the coil winding (70) from the winding template (26) completely or in part.

2. The method as claimed in claim 1, wherein all the wires (32) are fed synchronously at the same time.

3. The method as claimed in claim 1, wherein the wires (32) are gradually fed.

4. The method as claimed in claim 3, wherein the wires (32) fed subsequently are first of all introduced corresponding to steps B) to D) between the wires already fed to the rotational axis of the winding template (26) and are realized with the angled portion (40) before the wires are incorporated into the recurring method steps with steps E) or I).

5. The method as claimed in claim 1, wherein in step A), E) or I) the wires (32) are fed with their wire ends (30) using a wire drawing device (16), wherein the wires (32) are removed from a wire stock.

6. The method as claimed in claim 5, wherein the free wire ends (30) of the wires (32) just fed in step B) or C) are angled in the direction of the rotational axis of the winding template (26) by means of the wire drawing device (16), which is clamped with the wire ends (30), with reference to the first holding region (34) of the wires (32) for forming the winding connections.

7. The method as claimed in claim 6, wherein the forming of the angled wire portion (40) in step D is carried out as a result of displacing a first holding device (18) relatively to a second holding device (20).

8. The method as claimed in claim 6, wherein the rotating of the winding template (26) in step E, a first holding device (18) is displaced to the holding point of the third holding region (46) and a second holding device (20) with the clamped wires (32) is displaced into the first holding region (34), as a result of which further wire is also removed from a wire store.

9. The method as claimed in claim 1, wherein the wires (32) are secured at the holding points on the winding template (26) in step B by a first holding device (18) and in step C by a second holding device (29).

10. The method as claimed in claim 1, wherein the winding heads (42) are post formed in the region of the bending region which was realized beforehand in step E or I from the angled wire portion (40) as a result of the rotating of the winding template (26).

11. The method as claimed in claim 10, further comprising a profiled forming tool (50) is pressed against the winding heads (42) for the final forming of the winding heads (42).

12. The method as claimed in claim 1, wherein the holding of the adjusted wires (32) in step F) is carried out using a third holding device (22).

13. The method as claimed in claim 12, wherein first and third holding devices (118, 122) are coupled with the winding template (26) in the direction of rotation and alternately fix the wires (32) in first or third holding region (34, 46) depending on the rotational state of the winding template (26).

14. The method as claimed in claim 13, wherein the first and third holding devices (118, 122) are moved axially, and radially between each of the end positions with reference to the rotational axis of the winding template (26).

15. The method as claimed in claim 13, wherein the wires between the second and first holding regions (34, 36) are entrained by a second holding device (20) which is moved to and fro between said holding regions.

16. The method as claimed in claim 15, wherein a wire laying device is used as the second holding device (20).

17. The method as claimed in claim 12, wherein three holding devices are moved in a circulating manner between three holding regions (34, 36, 46), wherein with the rotating of the winding template in step I), one of the three holding devices is displaced to the fixing point of the first holding region (34) and another holding device (20) of the three holding devices having the clamped wires (32) is displaced into the first holding region (34) causing a further wire to be removed from a wire store.

18. The method as claimed in claim 1, wherein the severing of the wires (32) in step L) is effected in a rotational position of the winding template (26) in which the wire beginnings (30) fed at first are located on the side of the winding template on which the wire feed is effected.

19. The method as claimed in claim 1, wherein the wires (32) are swapped in pairs once or multiple times prior to reaching the second holding region (36) during the feeding of step A.

\* \* \* \* \*